(12) United States Patent
Sugahara

(10) Patent No.: US 8,349,150 B2
(45) Date of Patent: Jan. 8, 2013

(54) ACTUATOR FOR MOVING A MOVABLE BODY BY ELECTROWETTING

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 806 days.

(21) Appl. No.: 11/861,633

(22) Filed: Sep. 26, 2007

(65) Prior Publication Data

US 2008/0073216 A1  Mar. 27, 2008

(30) Foreign Application Priority Data

Sep. 27, 2006  (JP) .................................. 2006-261906

(51) Int. Cl.
  *B01J 8/08*  (2006.01)
(52) U.S. Cl. ..................... 204/229.5; 359/228; 310/309; 310/11
(58) Field of Classification Search ............... 204/229.5, 204/230.6, 643, 547; 359/228, 230; 310/300, 310/308–310, 11, 12.05
See application file for complete search history.

(56) References Cited

U.S. PATENT DOCUMENTS

| | | | |
|---|---|---|---|
| 6,911,132 B2 | 6/2005 | Pamula et al. | |
| 2004/0058450 A1 | 3/2004 | Pamula et al. | |
| 2005/0111842 A1 | 5/2005 | Nakagawa | |
| 2008/0094448 A1* | 4/2008 | Sugahara | 347/55 |

FOREIGN PATENT DOCUMENTS

| | | |
|---|---|---|
| JP | 2004-336898 A | 11/2004 |
| JP | 2005-185090 A | 7/2005 |
| JP | 2006-500596 A | 1/2006 |
| JP | 2007-166785 A | 6/2007 |
| WO | 2004097495 A1 | 11/2004 |

OTHER PUBLICATIONS

European Patent Office; Extended European Search Report for European Patent Application No. 07018959.2 (counterpart to the above-captioned U.S. patent application) mailed Nov. 26, 2009.
Japan Patent Office, Notice of Reasons for Rejection for Japanese Patent Application No. 2006-261906 (counterpart to above-captioned patent application), mailed Nov. 8, 2011.

* cited by examiner

*Primary Examiner* — J. Christopher Ball
(74) *Attorney, Agent, or Firm* — Baker Botts L.L.P.

(57) ABSTRACT

An actuator includes a fixed including a substrate, electrodes disposed on a surface of the substrate, and an insulating layer disposed on the surface of the substrate to cover the electrodes. The actuator includes an electrically conductive, liquid member disposed on and contacting a surface of the insulating layer, a movable body contacting the liquid member, a retaining device configured to adhere the liquid member to the movable body, a device configured to apply potential to each of the electrodes, and a controller configured to control the device. The controller controls the device to change potential applied to each of the electrodes to vary liquid repellency of the insulating layer in response to potential difference applied between each of the electrodes and the liquid member to change at least one of a contact portion between the liquid member and the insulating layer and a contact area of the liquid member contacting on the surface of the insulating layer, to move the movable body relative to the fixed body.

22 Claims, 22 Drawing Sheets

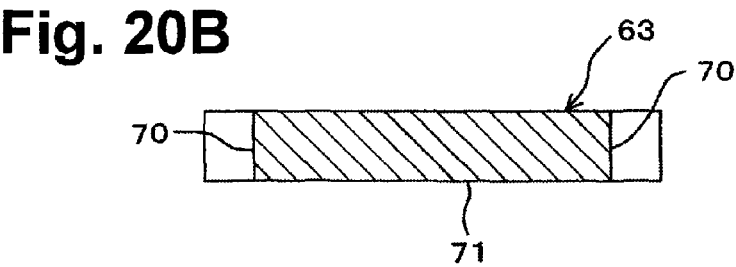
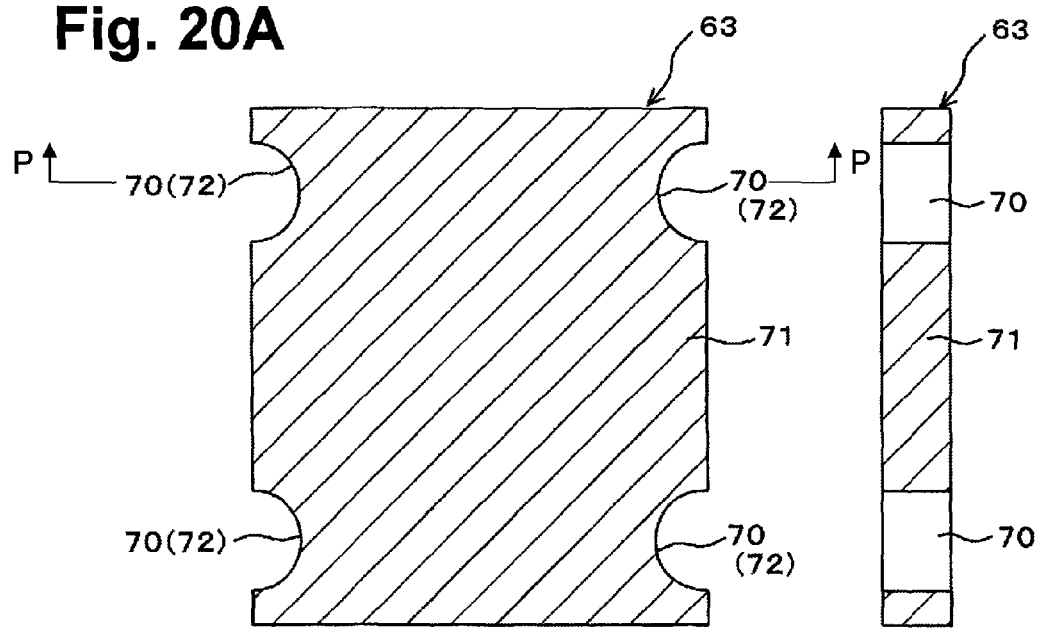

ACTUATOR FOR MOVING A MOVABLE BODY BY ELECTROWETTING

CROSS-REFERENCE TO RELATED APPLICATION

The present application claims priority from Japanese Patent Application No. 2006-261906, filed on Sep. 27, 2006, the disclosure of which is incorporated herein by reference in its entirety.

BACKGROUND

1. Field of the Invention

The invention relates to an actuator capable of minutely moving a movable body with respect to a fixed body by electrowetting.

2. Description of Related Art

Electrowetting is known as a phenomenon in which, when potential difference is applied between an electrode covered by an insulating layer and a liquid droplet resting on a surface of the insulating layer, a wetting angle (i.e., a contact angle) of the liquid droplet with respect to the surface of the insulating layer is changed due to changes in interfacial tension between the liquid droplet and the surface of the insulating layer. If electrowetting is applied to various drive devices, the drive devices drive with less electric power as compared with known devices employing electric motors or piezoelectric actuators. Further, the drive device employing electrowetting is smaller than such known devices.

For example, as described in Japanese Laid-open Patent Publication No. 2005-185090, electrowetting is applied to a device driven when a focus of a camera lens is adjusted. The device includes a first structure body and a second structure body disposed opposite to the first structure body to move toward or away from the first structure body and such that a liquid droplet disposed between the first and second structure bodies contacts the first and second structure bodies.

The first structure body includes a first electrode, an insulating layer formed on a surface of the first electrode, and a first liquid repellent layer covering the insulating layer on its surface opposite to the second structure body. The second structure body includes a second electrode and a second liquid repellent layer surrounding the second electrode on its surface opposite to the first structure body. The liquid droplet contacts the second liquid repellent layer and the second electrode at all times. When a voltage is placed between the first electrode and the second electrode with which the liquid droplet is in contact, a contact angle of the liquid with respect to the surface of the first liquid repellent layer which the liquid droplet contacts is changed by electrowetting. Thus, a height of the liquid droplet between the first and second structure bodies is reduced, so that a distance between the first and second structure bodies is decreased. In this manner, the first structure body moves toward the second structure body.

SUMMARY OF THE INVENTION

In the actuator described in Japanese Laid-open Patent Publication No. 2005-185090, the first structure body moves toward and away from the second structure body. Nevertheless, the first structure body cannot move parallel to the second structure body and cannot rotate with respect to the second structure body. Accordingly, the first structure body has little flexibility in its movements, thereby limiting its applicability.

Thus, a need has arisen for an actuator that implements various relative movements of a movable body with respect to a fixed body by application of electrowetting to increase flexibility in the movements of the movable body.

According to an embodiment of the invention, an actuator may comprise a fixed body comprising a substrate, a plurality of electrodes disposed on a surface of the substrate, and an insulating layer disposed on the surface of the substrate to cover the plurality of electrodes. The actuator may comprise an electrically conductive, liquid member disposed on and contacting a surface of the insulating layer, a movable body contacting the liquid member, a retaining device configured to adhere the liquid member to the movable body, a device configured to apply an electrical potential to each of the plurality of electrodes, and a controller configured to control the device. The controller may control the potential applying device to change the potential applied to each of the plurality of electrodes to vary liquid repellency of the insulating layer in response to a difference in the potential applied between each of the plurality of electrodes and the liquid member to change at least one of a contact portion between the liquid member and the insulating layer and a contact area of the liquid member contacting on the surface of the insulating layer, to move the movable body relative to the fixed body.

When a potential difference exists between the electrodes covered by the insulating layer and the liquid member contacting the surface of the insulating layer, the liquid repellency of the surface of the insulating layer changes due to the potential difference (i.e., due to electrowetting). Therefore, the controller may control the device to change the potential applied to the plurality of electrodes for changing one of a contact portion between the liquid member and the insulating layer and a contact area of the liquid member contacting the surface of the insulating layer. By this structure, various relative movements (e.g., parallel translations, rotations, up-and-down movements, and inclinations) of the movable body with respect to the fixed body may be achieved. Thus, the actuator with the movable body has a high degree of flexibility in its movements. By application of electrowetting, the movable body may move relative to the fixed body with an uncomplicated structure including the electrodes, the insulating layer, and the liquid member. Accordingly, the size of the actuator may be reduced, and the actuator may drive the movable body with less power consumption than known actuators.

According to an embodiment of the invention, in the actuator, the device may apply either a first potential or a second potential to each of the plurality of electrodes. The liquid repellency of the insulating layer covering those of the plurality of electrodes having the first potential may be less than that of the insulating layer covering those of the plurality of electrodes having the second potential. With this structure, the liquid repellency of the surface of the insulating layer may be changed by switching the potential applied to the electrodes between the two different potentials (e.g., the first and second potentials) by the potential application device (hereinafter, the "device").

According to an embodiment of the invention, in the actuator, the controller may control the device to apply the first potential to simultaneously a plurality of adjacent electrodes of the plurality of electrodes. With this structure, when the liquid member moves along the surface of the insulating layer by incrementally shifting the portion (a "target") of the plurality of electrodes to which the predetermined first potential is applied by the potential applying device, one or more electrodes whose potential remains at the first potential at the time of switching may exist at all times. Thus, an area in which the behavior of the liquid member is stabilized due to a decrease of the liquid repellency may exist at all times during the movement of the liquid member, so that liquid member may move smoothly.

According to an embodiment of the invention, in the actuator, when the device charges a portion of the plurality of electrodes to which the predetermined first potential is applied, the controller may control the device to continue applying the first potential to at least one of the plurality of adjacent electrodes to which the first potential has been applied. With this structure, when the liquid member moves along the surface of the insulating layer by incrementally shifting the portion of the plurality of electrodes to which the predetermined first potential is applied by the potential applying device, at least one electrode the potential of which remains at the first potential at the time of switching may exist at all times. Thus, an area in which the behavior of the liquid member is stabilized due to a decrease of the liquid repellency may exist at all times during the movement of the liquid member, so that the liquid member may move smoothly.

According to an embodiment of the invention, in the actuator, the liquid member further may comprise a plurality of liquid droplets adhering to the surface of the movable body. The plurality of liquid droplets may be disposed on the surface of the insulating layer. With this structure, the movable body may move relative to the fixed body (e.g., parallel translations, rotations, up-and-down movements, and inclinations).

According to an embodiment of the invention, in the actuator, the controller may control the device to reduce simultaneously liquid repellency of a plurality of first areas on the surface of the insulating layer. Each of the plurality of first areas may be adjacent to at least one of a plurality of second areas, to which the plurality of liquid droplets contact on the surface of the insulating layer, and are disposed in a substantially circumferential direction around a circle having a predetermined center. The plurality of liquid droplets may move along the circumferential direction in response to the reduction of the liquid repellency, so that the movable body may rotate about the predetermined center.

According to an embodiment of the invention, in the actuator, each of the plurality of electrodes may have a substantially sector shape in plan view and may be disposed annularly on the substrate to define a circle. With this structure, the plurality of liquid droplets may move smoothly along the circle defined by the plurality of electrodes, so that the movable body may rotate without displacement of its center position.

According to an embodiment of the invention, in the actuator, the plurality of liquid droplets may be disposed at regular intervals in a circumferential direction around the circle defined by the plurality of electrodes. With this structure, the movable body may be supported stably by the liquid droplets when rotated.

According to an embodiment of the invention, in the actuator, the controller may control the device to reduce simultaneously the liquid repellency of a plurality of first areas on the surface of the insulating layer. Each of the plurality of first areas may be adjacent to at least one of a plurality of second areas, to which the plurality of liquid droplets contact on the surface of the insulating layer, and are disposed in a predetermined direction, substantially parallel to the surface of the insulating layer. The plurality of liquid droplets may move in the predetermined direction in response to the reduction of the liquid repellency, so that the movable body may move in the predetermined direction. With this structure, the movable body moves substantially parallel to the fixed body in the predetermined direction along the surface of the insulating layer.

According to an embodiment of the invention, in the actuator, the controller may control the device to increase or decrease the size of each of the contact areas between the plurality of liquid droplets and the surface of the insulating layer, and thereby the movable body may move towards or away from the fixed body.

According to an embodiment of the invention, in the actuator, the controller may control the device to increase or decrease an area, to which at least one of the plurality of liquid droplets adheres on the surface of the insulating layer, and thereby the movable body may incline with respect to the fixed body.

According to an embodiment of the invention, in the actuator, the controller may control the device to increase an area, to which at least a first one of the plurality of liquid droplets adheres on the surface of the insulating layer, and to decrease an area, to which at least a second one of the plurality of liquid droplets adheres on the surface of the insulating layer, and thereby the movable body may incline with respect to the fixed body. With this structure, the movable body may attain a greater degree of inclination with respect to the fixed body.

According to an embodiment of the invention, in the actuator, at least a portion of the movable body contacting the liquid member may remain at a constant potential. With this structure, the potential of the liquid member may remain at the substantially constant potential, so that fluctuations in potential difference between the electrode and the liquid member due to fluctuations in the potential of the liquid member may be reduced or minimized. Accordingly, the movable body may move stably, so that greater reliability of the movements of the actuator may be achieved.

According to an embodiment of the invention, in the actuator, the retaining device may comprise a lyophilic area disposed on the surface of the movable body, and a liquid repellent area disposed on the surface of the movable body to surround the lyophilic area. The liquid repellent area may have greater liquid repellency than the lyophilic area. With this structure, the lyophilic area to which the liquid member adheres is surrounded with the greater liquid repellency area. By the provision of the liquid repellent area, the movements of the liquid member are controlled, such that the liquid member does not flow out of the lyophilic area. Accordingly, the liquid member remains adhered to the lyophilic area, so that the adhesion of the liquid member and the movable body is retained.

According to an embodiment of the invention, in the actuator, the retaining device may comprise a recessed portion disposed on the surface of the movable body. A wetting angle of the liquid member with respect to the recessed portion may be less than 90 degrees. With this structure, the wetting angle of the liquid member with respect to the inside portion of the recessed portion may be less than 90 degrees. Accordingly, the liquid member is drawn into the recessed portion by capillary action and is retained therein, so that the liquid member remains adhered to the movable body.

According to an embodiment of the invention, in the actuator, the retaining device may comprise a roughened portion disposed on the surface of the movable body, and a smoother portion disposed on the surface of the movable body to surround the roughened portion and having a surface roughness less than that of the roughened portion. A wetting angle of the liquid member with respect to the roughened portion may be less than 90 degrees. With this structure, because the wetting angle of the liquid member with respect to the roughened portion disposed at the surface of the movable body may be less than 90 degrees, the liquid member is drawn into the recessed portion by capillary action. In addition, the roughened portion may be surrounded by the smoother portion having less surface roughness, so that the movement of the liquid member is controlled such that the liquid member does not flow out of the roughened portion to the smoother portion. Thus, the liquid member may remain adhered to the movable body at the roughened portion.

According to an embodiment of the invention, in the actuator, the retaining device may comprise a smoother portion disposed on the surface of the movable body, and a roughened portion disposed on the surface of the movable body to surround the smoother portion. The roughened portion has surface roughness greater than that of the smoother portion. A wetting angle of the liquid member with respect to the roughened portion may be greater than or equal to 90 degrees. With this structure, because the wetting angle of the liquid member with respect to the roughened portion disposed at the surface of the movable body may be greater than or equal to 90 degrees, the roughened portion may have very much greater liquid repellency, such that the liquid member contacts tips of projections of the roughened portion. Therefore, the liquid repellency of the smoother portion is relatively less than that of the roughened portion, so that the liquid member adheres to the smoother portion. In addition, the smoother portion may be surrounded by the roughened portion having very much greater liquid repellency. Accordingly, the movements of the liquid member adhering to the smoother portion are controlled, such that the liquid member does not flow from the smoother portion. Thus, the liquid member remains adhered to the movable body at the smoother portion.

According to an embodiment of the invention, in the actuator, the substrate may have a curved surface, e.g., a concave surface or a convex surface or a surface that comprises both convex and concave portions. With this structure, the movable body may move in a direction along the curved surface of the substrate.

According to an embodiment of the invention, in the actuator, the movable body may be displaced from the insulating layer. With this structure, a frictional force may not arise between the movable body and the insulating layer, so that the movable body may move readily relative to the fixed body.

According to an embodiment of the invention, in the actuator, the liquid member may be disposed between the insulating layer and the movable body. With this structure, the dimensions of the liquid member disposed between the insulating layer and the movable body may change in response to the liquid repellency of the surface of the insulating layer. By this structure, the movable body may move readily towards or away from the fixed body or may incline readily with respect to the fixed body.

According to an embodiment of the invention, in the actuator, the liquid member may adhere to a side surface of the movable body. With this structure, when the liquid member moves along the insulating layer, a driving force of the liquid member acts directly on the movable body. Accordingly, parallel translations and rotations of the movable body with respect to the fixed body may be implemented more readily.

According to an embodiment of the invention, the actuator further may comprise a support member disposed between the insulating layer and the movable body to frictionlessly, support the movable body e.g., by means of a cylindrical spherical body or bodies. With this structure, the movable body may move smoothly on the surface of the insulating layer via the rolling support member while stably supported by the support member.

According to an embodiment of the invention, in the actuator, the liquid member may be a nonvolatile liquid. With this structure, the liquid member may not evaporate, so that the actuator may be used for a long time.

According to an embodiment of the invention, in the actuator, the liquid member may be a volatile liquid and may be coated with a nonvolatile liquid. With this structure, the evaporation of volatile liquid member may be reduced or minimized, so that the actuator may be used for a long time.

Other objects, features, and advantages of the invention will be understood by those skilled in the art from the following detailed description and accompanying drawings.

BRIEF DESCRIPTION OF THE DRAWINGS

Embodiments of the invention will be described in detail with reference to the following figures in which like elements are labeled with like numbers.

FIG. 20A is a bottom view of a movable body according to the embodiment of FIG. 19A.

FIG. 20B is a cross-sectional view of the movable body of FIG. 20A, taken along a line P-P of FIG. 20A.

FIG. 20C is a side view of the movable body of FIG. 20A.

DETAILED DESCRIPTION OF EMBODIMENTS

An embodiment of the invention is described with reference to FIGS. 1 to 8B. In this embodiment, the invention is an actuator configured to minutely move a predetermined object. For example, the actuator may be a lens drive device for adjusting a focus of a lens (e.g., a camera lens), a micromachine, or an assembling device for assembling precision machines, such as an inkjet head, from various components.

Figure 1A:
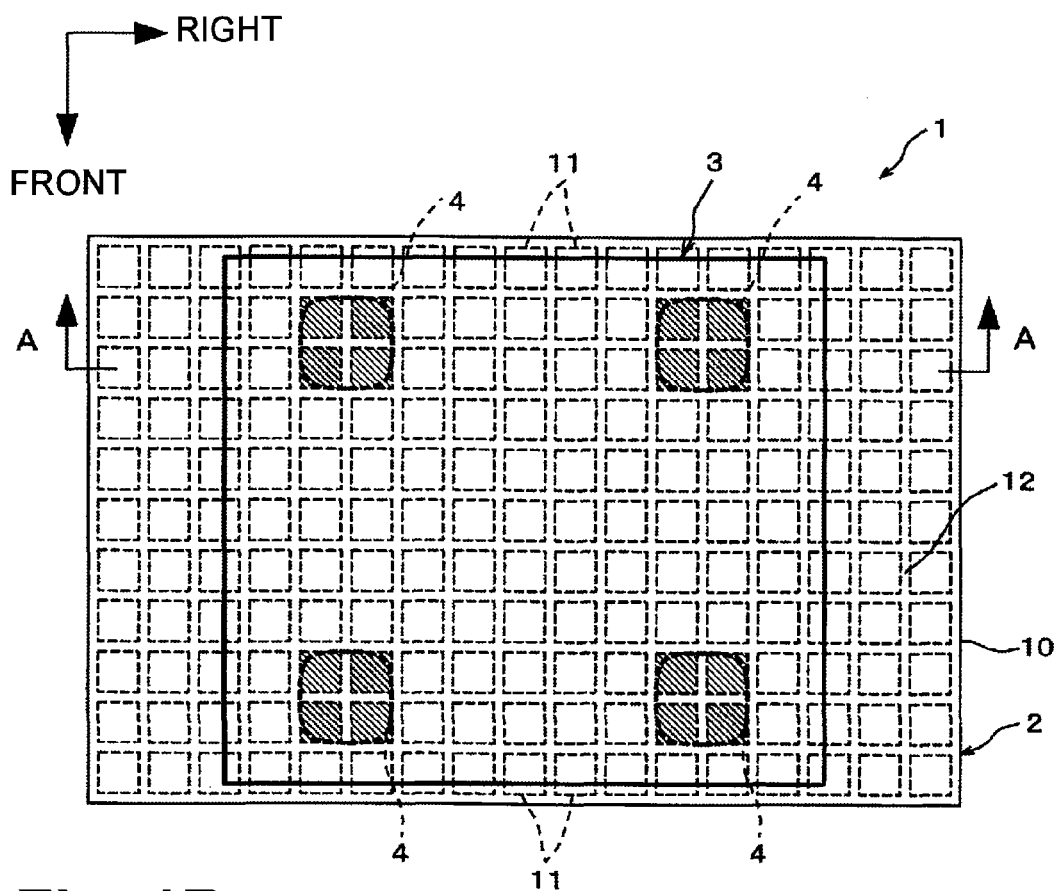
FIG. 1A is a plan view of an actuator according to an embodiment of the invention, wherein the actuator is in a reference state.
Figure 1B:
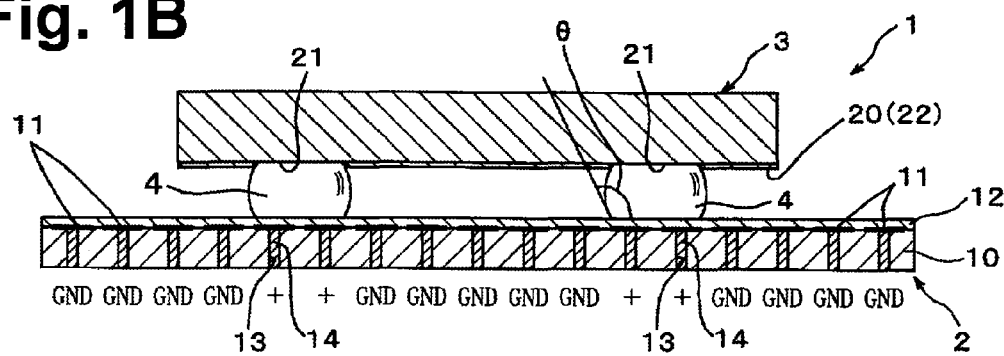
FIG. 1B is a cross-sectional view of the actuator of FIG. 1A, taken along a line A-A of FIG. 1A.

A direction parallel to the drawing sheet of FIG. 1A is referred to as a horizontal direction, and the bottom in FIG. 1A is referred to as the front of the depicted actuator, and the right in FIG. 1A is referred the right side of the depicted actuator. A direction perpendicular to the drawing sheet of FIG. 1A is referred to as an up-down direction, wherein a direction to be away from the drawing sheet of FIG. 1A is an up direction and a direction toward the drawing sheet of FIG. 1A is a down direction. The top in FIG. 1B is referred to as the top of the depicted actuator. These direction conventions also are applied to similar drawings among the accompanying drawings.

Figure 3:
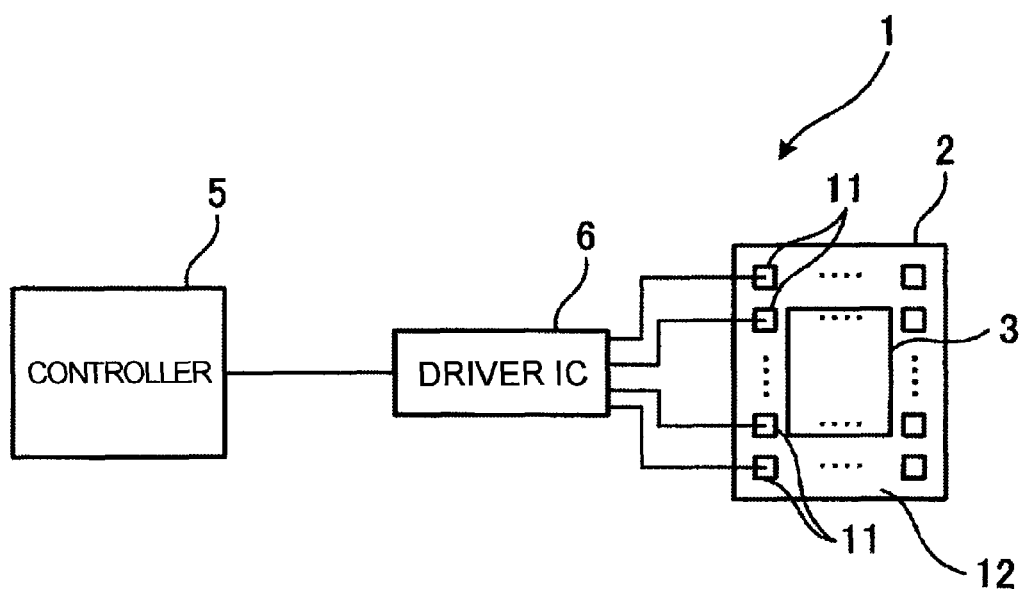
FIG. 3 is a diagram showing an electrical connection of the actuator.

As shown in FIGS. 1A and 1B, an actuator 1 may comprise a fixed body 2, a movable body 3, four liquid droplets 4 (functioning as a liquid member), and a controller 5 (see FIG. 3). Movable body 3 is configured to be relatively movable with respect to fixed body 2 while separated from fixed body 2. Movable body 3 also is configured to be integral with various objects to be driven. Liquid droplets 4 are disposed between fixed body 2 and movable body 3 and are electrically conductive. Controller 5 is configured to control movements of movable body 3 with respect to fixed body 2. Actuator 1 may be configured, for example, to adjust the focus of a lens attached to movable body 3, by moving four liquid droplets 4, which are adhered to movable body 3, parallel to a surface of fixed body 2 or changing the dimensions of the liquid droplets 4 to move the movable body 3 relative to fixed body 2 (e.g., parallel translations, rotations, up-and-down movements, and inclinations).

Fixed body 2 may comprise a substrate 10 which may be a flat plate made of an insulating material, a plurality of drive electrodes 11 disposed on a first, e.g., an upper surface of substrate 10, and an insulating layer 12 disposed on the first surface of substrate 10 covering plurality of drive electrodes 11.

Substrate 10 may comprise a synthetic resin material, such as polyamide, or an insulating material, such as insulating ceramic material, for example, alumina. Substrate 10 is a plate member having a substantially rectangular plane surface. Substrate 10 may have an insulating property on only a portion of its body. Substrate 10 may have an insulation property at least on its surface, such as a silicone plate having a silicone oxide layer on its surface. Each of plurality of drive electrodes 11 may have a substantially square and planar shape and may be disposed on the surface of substrate 10, at regular intervals, along two orthogonal directions (e.g., a front-rear direction and a right-left direction). Substrate 10 further may comprise a plurality of holes 13, formed therethrough, which extend from the first surface to a second, e.g., a lower, surface thereof, at portions thereof in which respective drive electrodes 11 are disposed. Each of holes 13 may be filled with a conductive material 14. Drive electrodes 11 are connected with a wiring pattern (not shown) disposed on the second surface of substrate 10, via conductive material 14 disposed in each of holes 13. Drive electrodes 11 also are electrically connected with a driver IC 6 (e.g., a potential application device: see FIG. 3) via the wiring pattern. Driver IC 6 may be configured to apply a predetermined potential to drive electrodes 11.

Insulating layer 12 may be disposed on the entire first surface of substrate 10 so as to completely cover drive electrodes 11. Insulating layer 12 may be formed of a synthetic resin material containing fluorine-based resin, such as polytetrafluoroethylene ("PTFE").

Four, electrically conductive, liquid droplets 4 are disposed on the surface of the insulating layer 12. Each of liquid droplets 4 have substantially the same volume. Conductive liquid droplets 4 may be water, a water-glycerin solution, or an ionic liquid (e.g., a salt molten at ambient temperature) containing only ions. The ionic liquid may not evaporate significantly because of its nonvolatile property even when exposed to the air for a long time.

Figure 2:
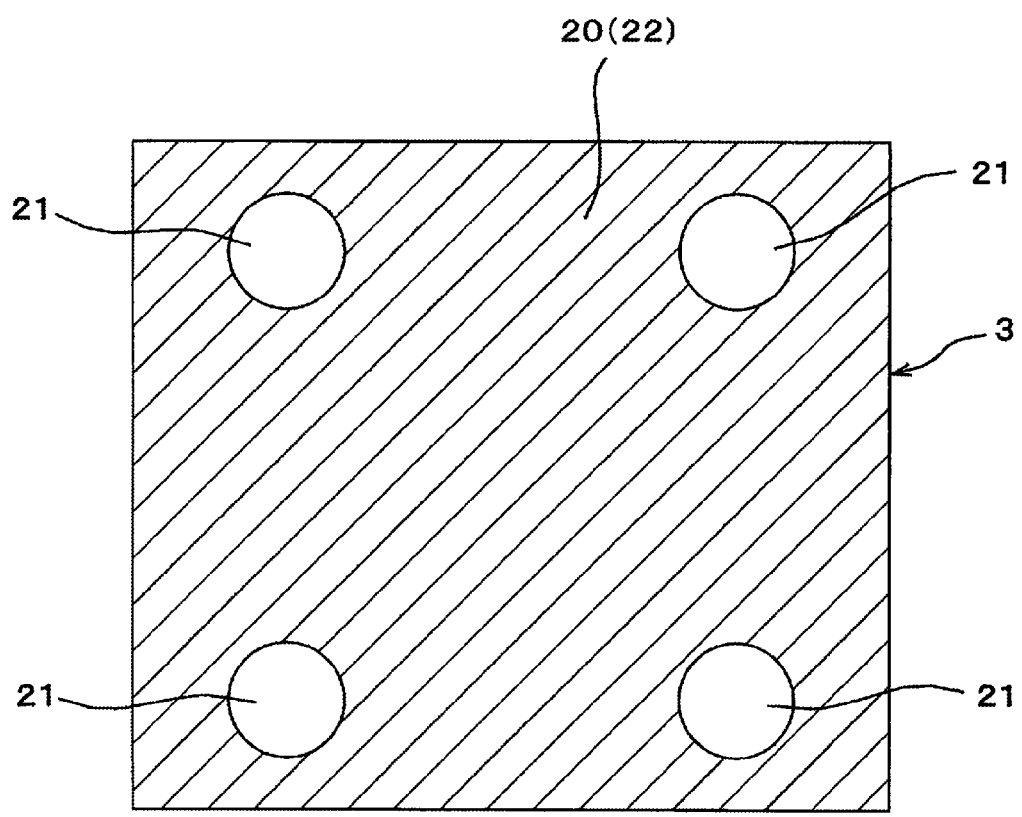
FIG. 2 is a bottom view of the actuator of FIG. 1A.

As shown in FIGS. 1A and 1B, movable body 3 is a substantially rectangular plate member in plan view. Movable body 3 may comprise a metallic material, such as aluminum. The entire body of movable body 3 may remain at a ground potential. As shown in FIG. 2, movable body 3 comprises a liquid repellent layer 20 at its second, e.g., lower, surface. Liquid repellent layer 20 may comprise a synthetic resin material containing fluorine-based resin, such as PTFE. Liquid repellent layer 20 also has greater liquid repellency than the surface of movable body 3 comprising metallic material. The second surface of movable body 3 is provided with four, substantially circular areas 21 at respective positions near four corners thereof. Liquid repellent layer 20 may be disposed entirely on the second surface of movable body 3, except in four areas 21, which are locally-exposed portions of the surface of movable body 3 and are lyophilic areas. Liquid repellent layer 20 may be disposed to surround lyophilic areas 21 and to provide a liquid repellent area 22 on the second surface of movable body 3. Thus, movable body 3 comprises four lyophilic areas 21 and liquid repellent area 22 on its second surface.

Four liquid droplets 4 disposed between the fixed body 2 and movable body 3 are in contact with respective lyophilic areas 21, and their movements are controlled by liquid repellent area 22 surrounding lyophilic areas 21, such that each of liquid droplets 4 do not flow from respective lyophilic areas 21. Thus, liquid droplets 4 remain adhered to the second surface of movable body 3 in respective lyophilic areas 21. Therefore, four lyophilic areas 21 and liquid repellent area 22 surrounding lyophilic areas 21 correspond to a retaining device for adhering liquid droplets 4 to movable body 3. Because all of movable body 3 remains at the ground potential, liquid droplets 4 contacting movable body 3 at all times remain at substantially ground potential.

As shown in FIG. 3, each of the plurality of drive electrodes 11 provided on the first surface of substrate 10 of fixed body 2 is connected with driver IC 6 via conductive material 14 filled in each of holes 13 in substrate 10 and the wiring pattern (not shown) formed on the second surface of substrate 10. Driver IC 6 is configured to selectively apply a first potential (e.g., a predetermined first potential) or a second potential (e.g., a ground potential) to each of drive electrodes 11 in accordance with instructions from controller 5 as described below).

In a state in which liquid droplets 4 whose potential remains at substantially ground potential present on the surface of insulating layer 12 covering drive electrodes 11, when driver IC 6 applies the first potential, which differs from the second potential, to drive electrodes 11, the potential difference is applied between liquid droplets 4 disposed on insulating layer 12 and drive electrodes 20 disposed on the opposite surface to corresponding liquid droplets 4. Then, the interfacial tension between liquid droplets 4 and insulating layer 12 changes based on the potential difference. As the potential difference increases, liquid repellency of insulating layer 12 (i.e., a wetting angle δ (e.g., a contact angle) of liquid droplets 4 with respect to insulating layer 12) experiences a greater decrease, due to electrowetting.

Because the liquid repellency of insulating layer 12 covering drive electrodes 11 to which the first potential is applied is less than that of insulating layer 12 covering drive electrodes 11 to which the ground potential is applied, the liquid repellency of the surface of insulating layer 12 may be readily changed by which driver IC 6 switches the potential applied to drive electrodes 11 between two different potentials (e.g., between the first potential and the second potential). One of the two different potentials applied to drive electrodes 11 by driver IC 6 may be the ground potential, so that two power supplies for the different potentials may not have to be provided, but a single power supply may be provided. Thus, the structure of driver IC 6 may be less complicated. The first potential applied to drive electrodes 11 may be different from the second potential so as to apply potential difference between liquid droplets 4 and insulating layer 12. The first potential may be either a positive potential greater than the ground potential or a negative potential less than the second potential.

In FIG. 1A, drive electrodes 11 indicated by a hatch pattern represent drive electrodes 11 to which the first potential is applied. In FIG. 1B, symbol "+" in the drawings represents that the first potential is applied to drive electrodes 11. Letters "GND" in the drawings represents that the second potential is applied to drive electrodes 11. Those indications also are used in other drawings.

As shown in FIGS. 1A and 1B, the first potential is applied to each of drive electrodes 11 arranged on substrate 10 in four areas corresponding to four, respective, lyophilic areas 21 (e.g., areas in which liquid repellent layer 20 is not formed) provided at the second surface of the movable body 3, and thus, the liquid repellency of insulating layer 12 is locally reduced in the four areas. Therefore, liquid droplets 4 adhered to movable body 3 in respective, lyophilic areas 21 may remain stable in respective, lyophilic areas 21 while remaining in contact with the surface of insulating layer 12. Movable body 3 is supported by stable liquid droplets 4 from the opposing surface.

Under this state, at least one of a position and a superficial content of each area on insulating layer 12 in which liquid repellency is reduced locally (i.e., at least one of a contact portion between each of liquid droplets 4 and insulating layer 12 and a contact area of each of liquid droplets 4 contacting the surface of insulating layer 12) is changed by which drive electrodes 11 applied with the first potential are appropriately changed. By this structure, various relative movements of movable body 3 with respect to fixed body 2 may be accomplished. The above-described actions of actuator 1 are described in detail with respect to the following explanation of controller 5.

Next, an electrical structure of actuator 1 is described with reference to FIG. 3. Controller 5 comprises a central processing unit ("CPU"), a read only memory ("ROM") configured to store programs and data for controlling actuator 1, and a random access memory ("RAM") configured to temporarily store data for processing by the CPU.

Controller 5 is configured to control the application of potentials to drive electrodes 11 performed by driver IC 6 (e.g., the switching of the potential to be applied to drive electrodes 11 between the two different potentials), in accordance with determinations made by controller 5 or instructions input from an external device (not shown) connected to controller 5. Controller 5 allows driver IC 6 to selectively apply the first potential or the second potential to each of drive electrodes 11 to perform a predetermined relative movement of movable body 3 with respect to fixed body 2 (e.g., a single or combined movement of parallel translations, rotations, up-and-down movements, and inclinations). Several example patterns of the potential application to drive electrodes 11 are described in five cases in which movable body 3 is standing still horizontally with respect to fixed body 2 (hereinafter, this state is referred to as a "reference state") and movable body 3 may move with respect to fixed body 2 (e.g., the parallel translations, rotations, up-and-down movements, and inclinations).

As shown in FIGS. 1A and 1B, when movable body 3 remains in the reference state, controller 5 controls driver IC 6 to apply the first potential to each of drive electrodes 11 arranged on substrate 10 in each of areas corresponding to the near-corner portions (in which four lyophilic areas 21 are provided and liquid droplets 4 are adhered thereto) of substantially rectangular, movable body 3. The number of drive electrodes 11 to which the first potential is applied with respect to each liquid droplet 4 is equal to each other among four liquid droplets 4. More specifically, as shown in FIG. 1A, driver IC 6 simultaneously applies the first potential to four drive electrodes 11, which are arranged adjacent to each other in two directions (e.g., a front-rear direction and a right-left direction), with respect to each of liquid droplets 4.

Therefore, a superficial content of each area on insulating layer 12 in which the liquid repellency is reduced, i.e., a contact area between each of liquid droplets 4 and insulating layer 12, is equal to each other among four liquid droplets 4. In addition, each of liquid droplets 4 have substantially the same volume, so that the dimensions thereof also are substantially the same. Accordingly, movable body 3 stands still and remains in a horizontal posture parallel to the first surface of fixed body 2 (e.g., the surface of insulating layer 12) while supported by four liquid droplets 4 having substantially the same dimensions.

When movable body 3 in the reference state shown in FIG. 1A moves parallel to the first surface of fixed body 2, controller 5 controls driver IC 6 to reduce simultaneously the liquid repellency of four areas on the surface of insulating layer 12. The four areas on the surface of insulating layer 12 are adjacent to the respective areas, to which four liquid droplets 4 currently contact on the surface of insulating layer 12, with respect to a predetermined direction parallel to the surface of insulating layer 12.

Figure 4A:
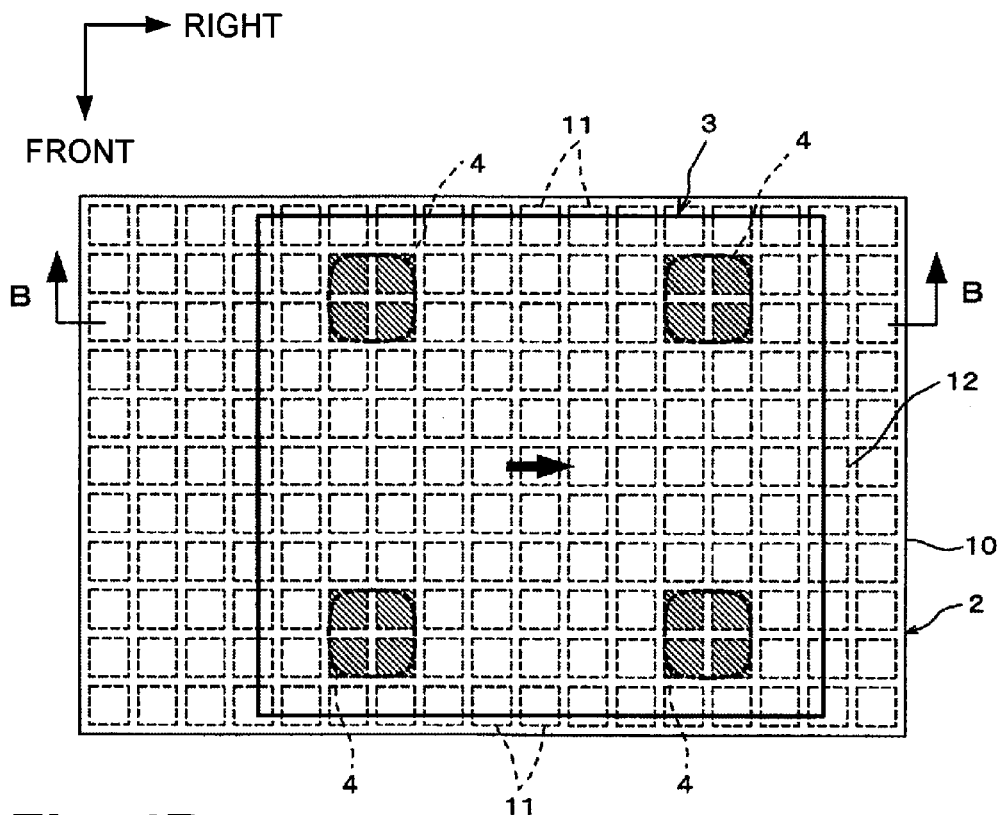
FIG. 4A is a plan view of the actuator that moves parallel to a fixed body.
Figure 4B:
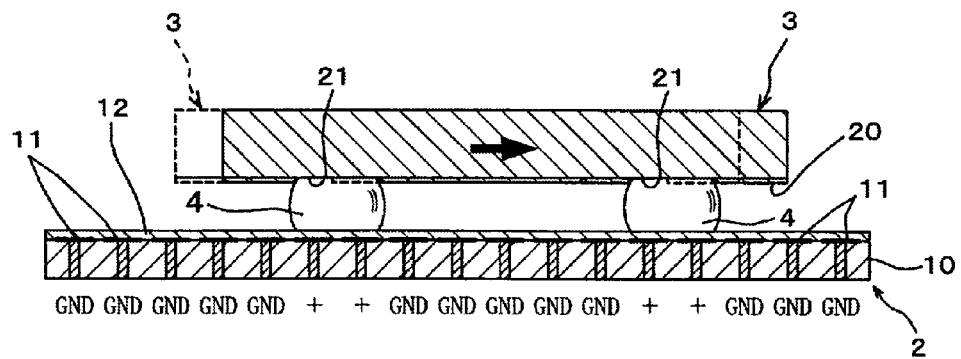
FIG. 4B is a sectional view of the actuator of FIG. 4A, taken along a line B-B of FIG. 4A.
Figure 5:
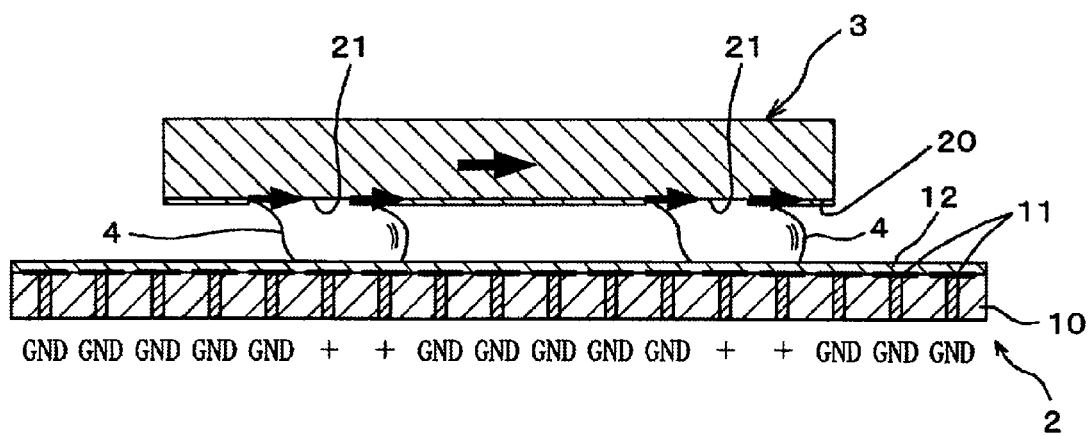
FIG. 5 illustrates a transfer of force of liquid droplets to the movable body when the movable body moves parallel to the fixed body.

For example, when movable body 3 moves rightward and parallel to the first surface of fixed body 2, controller 5 controls driver IC 6 to apply the first potential to two drive electrodes 11 which are arranged next to and to the right of each of four drive electrodes 11 to which the first potential is applied currently in each area, with respect to each liquid droplet 4. At the same time, the second potential is applied to left two drive electrodes 11 of four drive electrodes 11 to which the first potential is applied currently in each area, with respect to each liquid droplets 4. Thus, each of drive electrodes 11 to which the first potential is applied with respect to each liquid droplet 4 may be shifted rightward by one. Then, the liquid repellency of the areas, which are provided on the surface of insulating layer 12 and are adjacent to the respective areas to which liquid droplets 4 contact when movable body 3 is in the reference state, decreases simultaneously. In accordance with this condition, the contact portion between each of liquid droplets 4 and insulating layer 12 is shifted rightward by the distance of one drive electrode 11, so that liquid droplets 4 disposed on insulating layer 12 move rightward. At that time, as shown in FIG. 5, a rightward driving force is exerted on movable body 3 from liquid droplets 4 in the areas, which are provided on the second surface of movable body 3 and to which respective liquid droplets 4 adhere (e.g., lyophilic areas 21), so that movable body 3 moves rightward parallel to fixed body 2 while remaining in the horizontal posture. In FIG. 4B, movable body 3 before the parallel translation is indicated by a dashed line, and movable body 3 after the parallel translation is indicated by a solid line.

By shifting leftward drive electrodes 11 to which the first potential is applied by driver IC 6, the front direction or the rear direction with respect to each liquid droplet 4, movable body 3 may move leftward or frontward or rearward, respectively. Directions in which movable body 3 may move are not limited to the arrangement direction of drive electrodes 11. Movable body 3 may move in oblique directions, such as a direction toward the left front or the left rear or the right front or the right rear, by shifting drive electrodes 11 to which the first potential is applied by driver IC 6, in both the right-left direction and the front-rear direction.

When movable body 3 in the reference state shown in FIG. 1A is rotated with respect to the first surface of fixed body 2, controller 5 controls driver IC 6 to reduce simultaneously the liquid repellency of four areas on the surface of insulating layer 12. The four areas on the surface of insulating layer 12 are adjacent to the respective areas, to which four liquid droplets 4 currently contact on the surface of insulating layer 12, with respect to a circumferential direction around a circle sharing a center with a center of gravity P1 of movable body 3 (e.g., a direction along a circle C1 having the center of gravity P1 indicated by a double dot and dashed line in FIG. 6A).

Figure 6A:
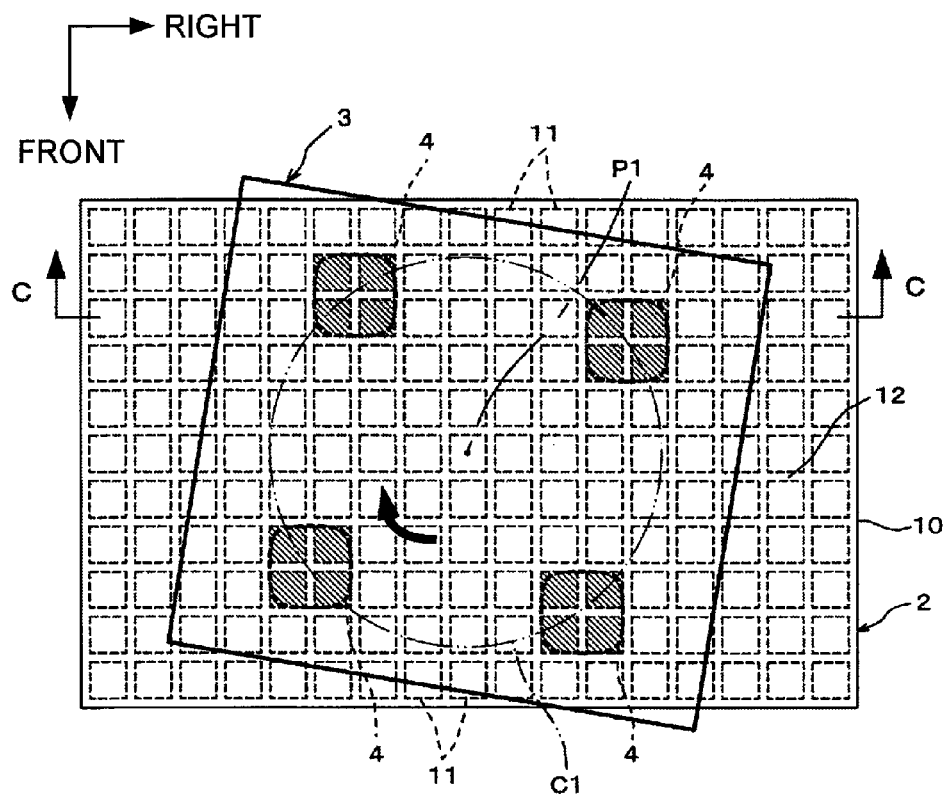
FIG. 6A is a plan view of the actuator that rotates with respect to the fixed body.
Figure 6B:
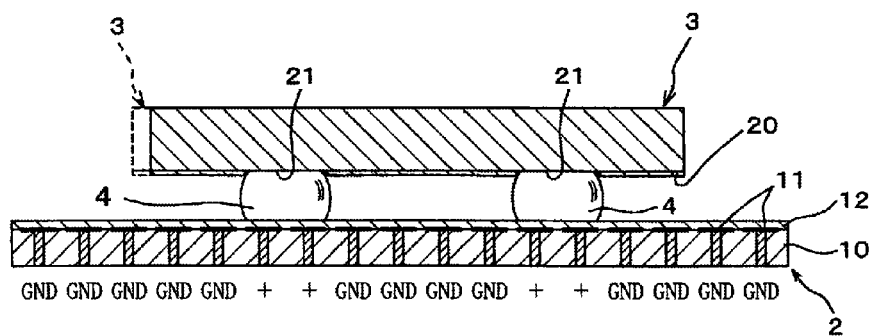
FIG. 6B is a cross-sectional view of the actuator of FIG. 6A, taken along a line C-C of FIG. 6A.

More specifically, as shown in FIGS. 6A and 6B, for example, when movable body 3 rotate in a clockwise direction in plan view (e.g., in the direction of an arrow in FIG. 6A), controller 5 controls driver IC 6 to shift drive electrodes 11 to which the first potential is applied with respect to each liquid droplet 4 in appropriate directions. Drive electrodes 11 to which the first potential is applied with respect to liquid droplet 4 located at the left front position (i.e., at the lower left position in FIG. 6A) are shifted toward the rear (i.e., the top in FIG. 6A), those with respect to liquid droplet 4 located at the left rear position (i.e., at the upper left position in FIG. 6A) are shifted toward the right, those with respect to liquid droplet 4 located at the right front position (i.e., at the lower right position in FIG. 6A) are shifted toward the left, and those with respect to liquid droplet 4 located at the right rear position (i.e., at the upper right direction in FIG. 6A) are shifted toward the front. Consequently, the areas in which the liquid repellency of the contacting surface of insulating layer 12 decreases (i.e., the areas to which liquid droplets 4 contact) are shifted in the clockwise direction along circle C1 having the center of gravity P1 of movable body 3, on the surface of insulating layer 12. In accordance with this condition, liquid droplets 4 move along circle C1. Thus, a driving force is exerted on movable body 3 from liquid droplets 4 adhered to movable body 3, so that movable body 3 rotates in the clockwise direction along circle C1. In FIG. 6B, movable body 3, before the rotation, is indicated by a dashed line, and movable body 3, after the rotation, is indicated by a solid line.

By shifting drive electrodes 11 to which the first potential is to be applied by driver IC 6, to directions opposite to the above-described directions, along the circle C1 having the center of gravity P1 of movable body 3, movable body 3 may be rotated in a counterclockwise direction by the movements of liquid droplets 4 in the counterclockwise direction along the circle C1.

In this illustrative embodiment, driver IC 6 applies the first potential to several drive electrodes 11 at the same time with respect to each liquid droplet 4. Thus, when movable body 3 is in the reference state, driver IC 6 applies the first potential to four drive electrodes 11 at the same time with respect to each liquid droplet 4. Therefore, when movable body 3 in the reference state moves parallel to the fixed body 2 or rotated with respect to fixed body 2, drive electrodes 11 to which the first potential is applied are shifted by one in a direction that liquid droplets 4 are desired to be moved. By this structure, with respect to each liquid droplet 4, one or more drive electrodes 11 whose potential remains at the first potential may exist at all times. As a result, while liquid droplets 4 are moved, there are areas in which liquid droplets 4 may rest stably on the surface of insulating layer 12 because of the reduction of the liquid repellency of the surface of insulating layer 12, so that behavior of liquid droplets 4 may be stabilized and liquid droplets 4 may move smoothly.

When movable body 3 in the reference state shown in FIG. 1A may move towards and away from, e.g., up and down with respect to, fixed body 2, controller 5 controls driver IC 6 to increase or decrease the same number of drive electrodes 11 to which the first potential is applied, with respect to each liquid droplet 4, thereby increasing or decreasing the contact area between each of liquid droplets 4 and the surface of insulating layer 12 by the same amount with respect to each liquid droplet 4.

Figure 7A:
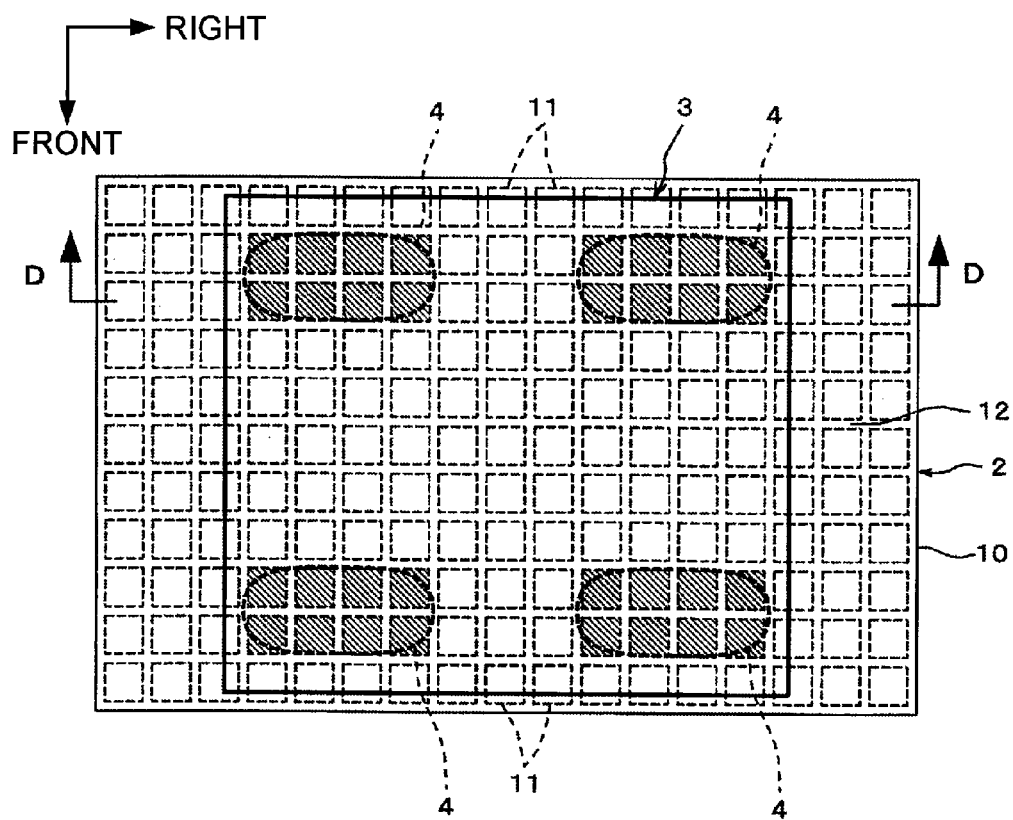
FIG. 7A is a plan view of the actuator that moves downward with respect to the fixed body.
Figure 7B:
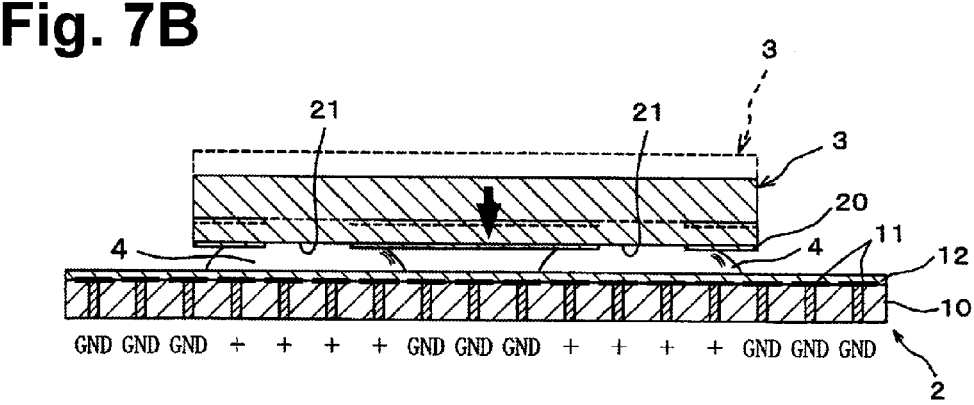
FIG. 7B is a cross-sectional view of the actuator of FIG. 7A, taken along a line D-D of FIG. 7A.

For example, when movable body 3 moves towards, e.g., downward with respect to, fixed body 2, as shown in FIGS. 7A and 7B, in addition to four drive electrodes 11 to which the first potential currently is applied with respect to each liquid droplet 4 when movable body 3 is in the reference state, the first potential is applied to another four drive electrodes 11 which are arranged next to and at the right and left of the four drive electrodes 11 to which the first potential currently is applied, with respect to each liquid droplet 4. Consequently, the total number of drive electrodes 11 to which the first potential currently is applied with respect to each liquid droplet 4 becomes eight drive electrodes 11. Thus, each of the areas in which the liquid repellency is reduced on the contacting surface of insulating layer 12 is expanded by the amount of increased number of drive electrodes 11. In accordance with this condition, liquid droplets 4 spread over the contacting surface of insulating layer 12 to increase the contact area between each of liquid droplets 4 and insulating layer 12. Therefore, at least one dimension of each of liquid droplets 4 is reduced. The total number of drive electrodes 11 to which the first potential is applied increases to eight drive electrodes 11 with respect to each liquid droplet 4, so that the reduced dimensions of liquid droplets 4 are equal to each other, and movable body 3 moves towards, e.g., downward with respect to, fixed body 2 by surface tension and weight of liquid droplets 4 while maintaining the horizontal posture parallel to the first surface of fixed body 2. In FIG. 7B, movable body 3, before descending is indicated by a dashed line, and movable body 3, after descending is indicated by a solid line.

When controller 5 controls driver IC 6 to decrease the total number of drive electrodes 11 to which the first potential is applied with respect to each liquid droplet 4, the contact area between each of the liquid droplets 4 and insulating layer 12 is decreased uniformly and at least one dimension of four liquid droplets 4 are increased uniformly. Accordingly, movable body 3 is urged away from fixed body 2 by liquid droplets 4, so that movable body 3 moves away from, e.g., upward with respect to, fixed body 2 while remaining in the horizontal posture parallel to the first surface of fixed body 2.

In the above description, the total number of drive electrodes 11 to which the drives potential is applied with respect to each liquid droplet 4 increases or decreases with respect to the right-left directions, but may increase or decrease with respect to the front-rear directions or further with respect to both the right-left directions and the front-rear directions.

When movable body 3 in the reference state shown in FIG. 1A inclines with respect to fixed body 2, controller 5 controls driver IC 6 to change the total number of drive electrodes 11 to which the first potential is applied, among four liquid droplets 4, to increase the content of some areas, which are provided on the surface of insulating layer 12 and to which some of liquid droplets 4 contact, and to decrease the content of the other areas, which are provided on the surface of insulating layer 12 and to which the rest of liquid droplets 4 contact.

Figure 8A:
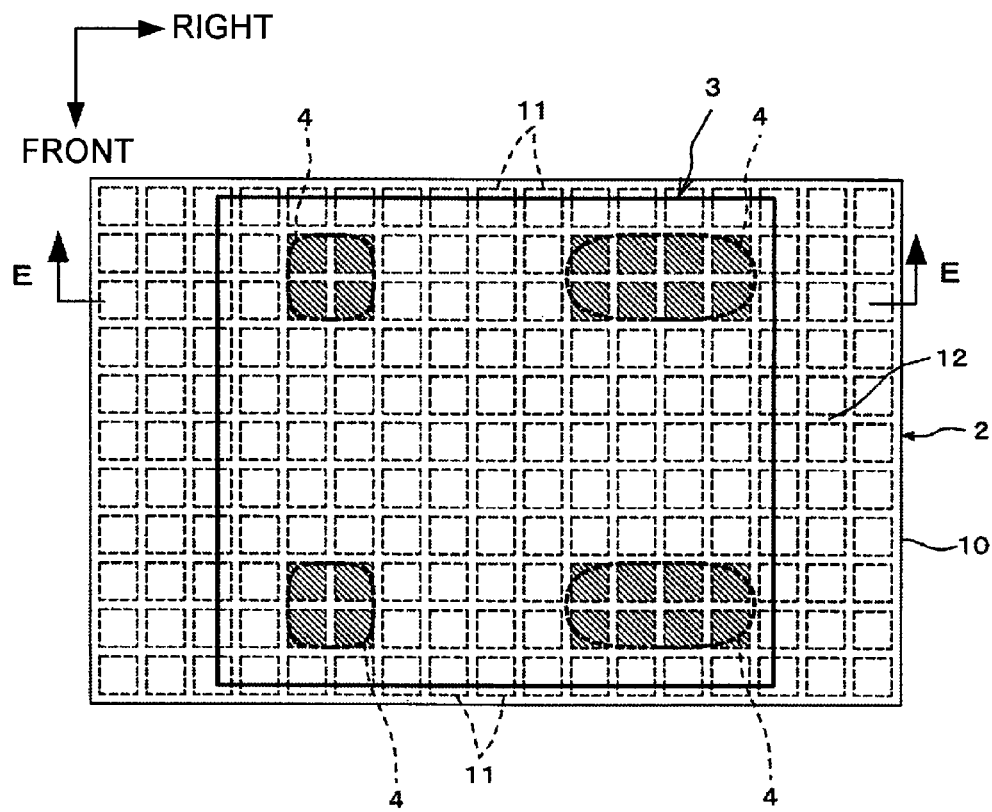
FIG. 8A is a plan view of the actuator that inclines with respect to the fixed body.
Figure 8B:
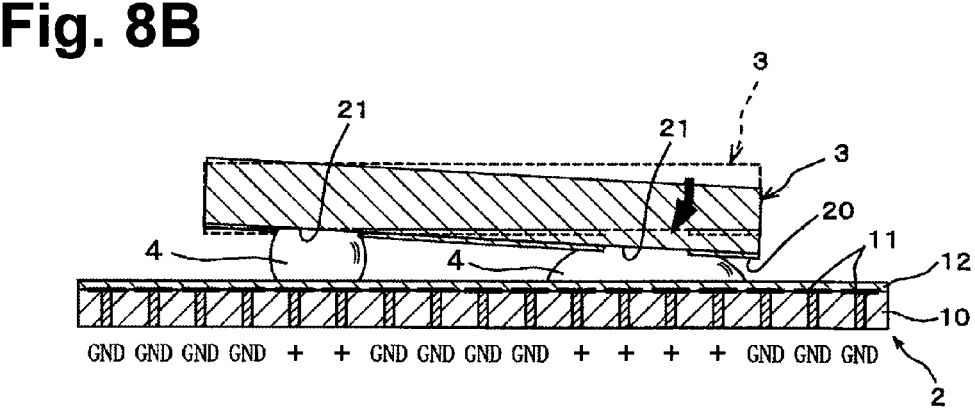
FIG. 8B is a cross-sectional view of the actuator of FIG. 8A, taken along a line E-E of FIG. 8A.

For example, as shown in FIGS. 8A and 8B, the total number of drive electrodes 11 to which the first potential is applied with respect to each of right-most two liquid droplets 4 increases to eight drive electrodes 11 while the total number of drive electrodes 11 with respect to each of left-most two liquid droplets 4 is not changed (e.g., four drive electrodes 11). By this structure, the contact area between each of right-most, liquid droplets 4 and insulating layer 12 increases, so that at least one dimension of right-most, liquid droplets 4 is reduced. Therefore, a right portion of movable body 3 contacting right-most, liquid droplets 4 moves toward fixed body 2, thereby inclining with respect to fixed body 2 with its right portion closer to fixed body 2 than its left portion. In FIG. 8B, movable body 3 before inclination is indicated by a dashed line, and movable body 3 after inclination is indicated by a solid line.

The total number of drive electrodes 11 to which the first potential is applied with respect to each of right-most two liquid droplets 4 may be reduced to two drive electrodes 11. In this case, the right portion of movable body 3 moves away from fixed body 2, e.g., upward, so that movable body 3 inclines with respect to fixed body 2 with its right portion offset farther from fixed body 2 than its left portion.

The total number of drive electrodes 11 to which the first potential is applied with respect to each of left-most, two liquid droplets 4 may be reduced to two drive electrodes 11 and that with respect to each of right-most, two liquid droplets 4 may be increased to eight drive electrodes 11. In this case, movable body 3 inclines with respect to fixed body 2 with its right portion offset farther from fixed body 2 than its left portion. In addition, an inclination amount of movable body 3 may be greater than that in the above inclined case.

Movable body 3 may be inclined toward the front or the rear with respect to fixed body 2 by which a difference occurs in the dimensions of liquid droplets 4 between front-most, two liquid droplets 4 and rear-most, two liquid droplets 4. Movable body 3 may incline with respect to one of diagonal axes thereof. Thus, controller 5 controls driver IC 6 to change the total number of drive electrodes 11 to which the first potential is applied with respect to each liquid droplet 4 such that the at least one dimension of each of liquid droplets 4 positioned along one of the diagonal axes of movable body 3 becomes equal to each other (this dimension is referred to as a "reference dimension"), the dimension of one of the remaining of liquid droplets 4 is greater, e.g., higher, than the reference dimension, and the dimension of the other of the remaining of liquid droplets 4 is less, e.g., lower, than the reference dimension. Movable body 3 then may incline, such that its two corners on both sides of the one of the diagonal axes thereof are located at a position greater, e.g., higher, than a level of the center of gravity of movable body 3 and a position less, e.g., lower, than the level of the center of gravity of movable body 3.

As apparent from the description of the movements, e.g., the up-and-down movements, and the inclinations of movable body 3, in actuator 1 of the first embodiment, four liquid droplets 4 are disposed especially between insulating layer 12 of fixed body 2 and movable body 3. Therefore, movable body 3 may move away from and toward fixed body 2 or may incline with respect to fixed body 2 by which the contact area between each of liquid droplets 4 and insulating layer 12 is changed to vary the dimensions of liquid droplets 4 disposed between movable body 3 and insulating layer 12.

In the first embodiment, the four patterns of the basic movements of movable body 3 relative to fixed body 2 (e.g., parallel translations, rotations, up-and-down movements, and inclinations) have been described. Nevertheless, controller 5 may control driver IC 6 to perform simultaneously two or more different movements of the four basic movements, so that movable body 3 may move in a more complex manner. For example, movable body 3 may incline with respect to fixed body 2 while moving parallel to the first surface of fixed body 2 or may move away from or toward, e.g., upward or downward with respect to, fixed body 2 while rotating.

An example of actuator 1 wherein movable body 3 moves especially parallel to fixed body 2 (in the relative movements of movable body 3 with respect to fixed body 2) now is described.

Movable body: Aluminum alloy plate (Length; 1 mm, Width; 1 mm, Thickness; 200 µm)
Surface tension of liquid droplet: 45 mN/m
Diameter of lyophilic area of movable body: 30 µm
(Length of one side of drive electrode: 18 µm)

For example, a perimeter of a lyophilic area 21 is obtained by; $30 \times 10^{-6} \times \pi = 9.4 \times 10^{-5}$ m. A force of a liquid droplet 4 acting on movable body 3 is obtained by; $9.4 \times 10^{-5}$ m (perimeter)$\times 45 \times 10^{-3}$ N/m (surface tension of liquid droplet)$=4.2 \times 10^{-6}$ N. Thus, a force of four liquid droplets 4 acting on the movable body 3 is obtained by; $4.2 \times 10^{-6}$ N×4 (number of liquid droplets)=16.8 µN. A mass of movable body 3 is about 0.6 mg (weight: $0.6 \times 10^{-3} \times 9.8 = 5.88$ µN). Accordingly, the force of four liquid droplets 4 acting on movable body 3 is sufficiently greater than the weight of movable body 3 to allow movable body 3 to move parallel to fixed body 2.

According to actuator 1 of the first embodiment, the following effects may be achieved. The plurality of drive electrodes 11 are covered with insulating layer 12 and are applied with the first potential or the second potential by driver IC 6 while arranged on the first surface of substrate 10 of fixed body 2. Four liquid droplets 4 adhering to movable body 3 are disposed on the surface of insulating layer 12 while in contact thereto. Accordingly, at least one of the contact portion between each of liquid droplets 4 and insulating layer 12 and the contact area of each of liquid droplets 4 contacting on insulating layer 12 is changed to implement the various relative movements of movable body 3 with respect to fixed body 2 (e.g., parallel translations, rotations, up-and-down movements, and inclinations) by which controller 5 controls driver IC 6 to appropriately change the total number of drive electrodes 11 to which the first potential is applied. Thus, actuator 1 comprises movable body 3 having an increased degree of flexibility in its movements.

By the application of electrowetting, movable body 3 may move relative to fixed body 2 with the structure comprising drive electrodes 11, insulating layer 12, and liquid droplets 4. Accordingly, the size of actuator 1 may be reduced, and actuator 1 may drive movable body 3 with less power consumption than an actuator employing a motor or a piezoelectric actuator.

Because the potential of movable body 3 may remain at a constant potential (e.g., the ground potential), the potential of liquid droplets 4 adhering to movable body 3 also remains substantially at the ground potential. Accordingly, variations in the potential difference between drive electrodes 11 and liquid droplets 4 caused due to potential fluctuations in liquid droplets 4 may be reduced or minimized, and the movements of movable body 3 may be stabilized. Thus, reliability of the operation of actuator 1 may be increased.

In addition, four liquid droplets 4 may be disposed between insulating layer 12 of fixed body 2 and movable body 3. Thus, movable body 3 may move away from or towards, e.g., up or down with respect to, fixed body 2 or may incline with respect to fixed body 2 by which the contact area between each of liquid droplets 4 and insulating layer 12 is changed to vary the at least one dimension of each of liquid droplets 4 disposed between movable body 3 and insulating layer 12. Further, movable body 3 may be supported by four liquid droplets 4 between insulating layer 12 of fixed body 2, e.g., from below, so that little or no contact friction occurs between movable body 3 and fixed body 2 when movable body 3 moves relative to fixed body 2 (in particular, parallel translations and rotations). Therefore, movable body 3 may be driven by a reduced driving force (e.g., a driving force with less power consumption). Because there are four liquid droplets 4 between movable body 3 and fixed body 2, movable body 3 and fixed body 2 do not directly contact each other. Consequently, no noise arises when movable body 3 moves with respect to fixed body 2.

Next, variations of the first embodiment are described, wherein like parts and components are designated by the same reference numerals to avoid duplicate descriptions.

The retaining device configured to adhere the liquid droplets to the lower surface of the movable body is not limited to the above-described device including the lyophilic areas and the liquid repellent area (e.g., the liquid repellent layer) surrounding the lyophilic areas. Various retaining devices having different structures also may be adopted.

Figure 9A:
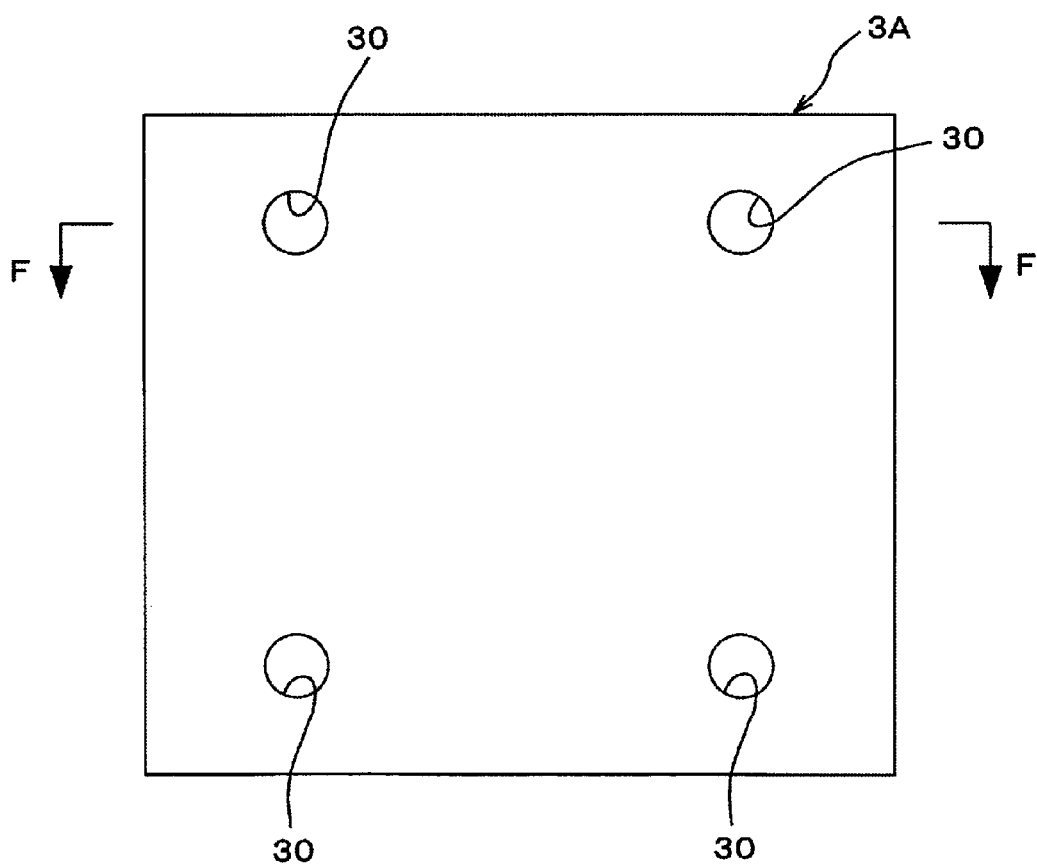
FIG. 9A is a bottom view of a movable body according to a first variation of the embodiment of FIG. 1A.
Figure 9B:
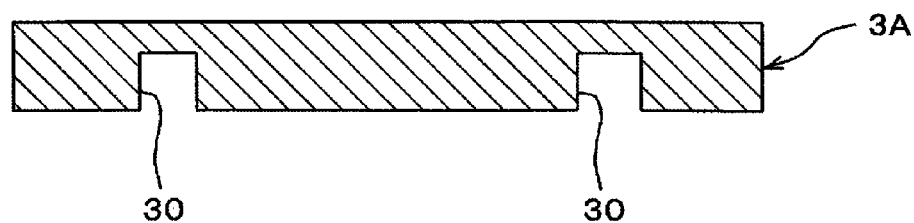
FIG. 9B is a cross-sectional view of the movable body of FIG. 9A, taken along a line F-F of FIG. 9A.
Figure 10:
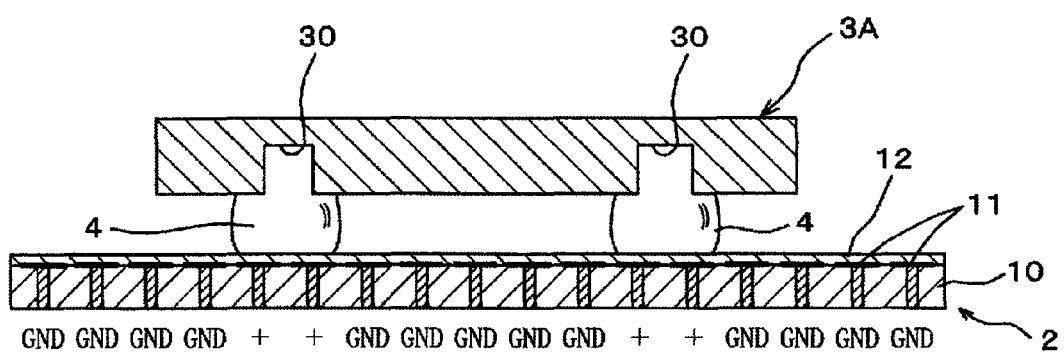
FIG. 10 is a cross-sectional view of an actuator according to the first variation.

For example, as shown in FIGS. 9A, 9B, and 10, a movable body 3A may be formed with four, circular, recessed portions 30 in its second, e.g., lower, surface at respective positions near four corners thereof. A wetting angle of four liquid droplets 4 with respect to interior portions of respective recessed portions 30 may be less than 90 degrees (i.e., a first variation). In the first variation, as shown in FIG. 10, liquid droplets 4 may be drawn into respective recessed portions 30 by capillary action and thereby adhere to movable body 3A. Similar to the first embodiment, a liquid repellent layer 20 (see FIG. 1B) having greater liquid repellency than the surface of movable body 3A may be formed on the second surface of movable body 3A, except in four recessed portions 30. By this structure, the movements of liquid droplets 4 may be controlled with certainty, such that liquid droplets 4 do not flow out of respective recessed portions 30.

Figure 11A:
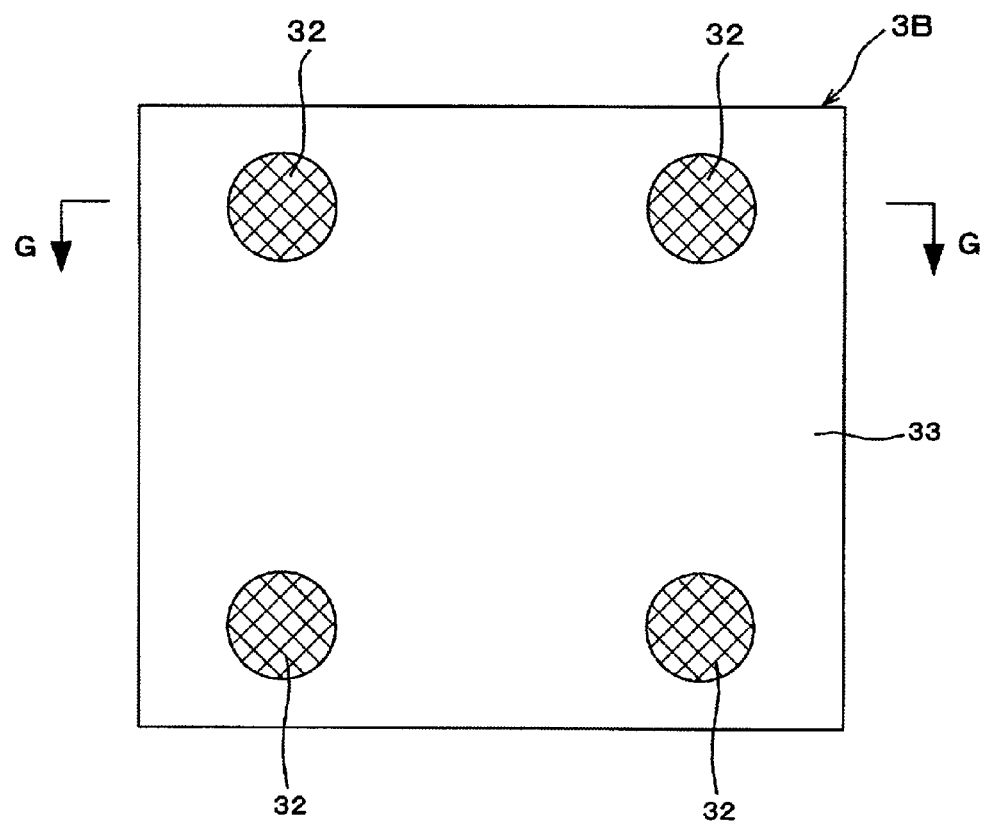
FIG. 11A is a bottom view of a movable body according to a second variation of the embodiments of FIG. 1A.
Figure 11B:
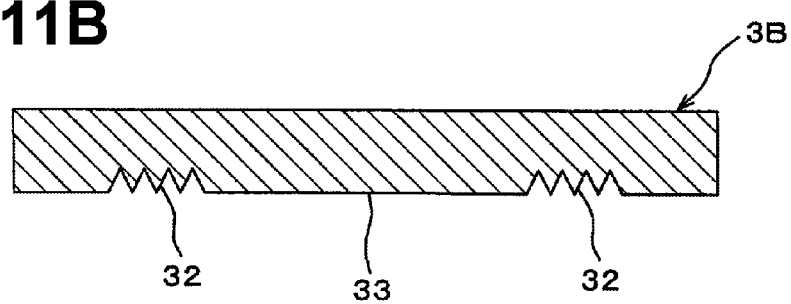
FIG. 11B is a cross-sectional view of the movable body of FIG. 11A, taken along a line G-G of FIG. 11A.

As shown in FIGS. 11A and 11B, a movable body 3B may include four roughened portions 32, each having a substantially circular shape in plan view and a smoother portion 33 having surface roughness which is less than that of roughened portions 32. Four roughened portions 32 may be disposed on the second surface of movable body 3B at respective positions near the four corners of movable body 3B. Smoother portion 33 may be disposed on the second surface of movable body 3B at an area other than that of roughened portions 32 to surround roughened portions 32 (i.e., a second variation). Roughened portions 32 may be disposed, such that a wetting angle of four liquid droplets 4 with respect to roughened portions 32 may be less than 90 degrees. Thus, liquid droplets 4 may be drawn into respective roughened portions 32, so that roughened portions 32 have substantially the same function as the lyophilic areas in which the wetting angle of liquid droplets 4 with respect to insulating layer 12 is reduced locally. In addition, roughened portions 32 may be surrounded by smoother portion 33 having less surface roughness and greater liquid repellency than those of roughened portions 32. Consequently, the movements of liquid droplets 4 adhering to respective roughened portions 32 may be controlled, such that liquid droplets 4 do not flow out of roughened portions 32. Therefore, liquid droplets 4 remain adhered to movable body 3B at roughened portions 32.

Figure 12A:
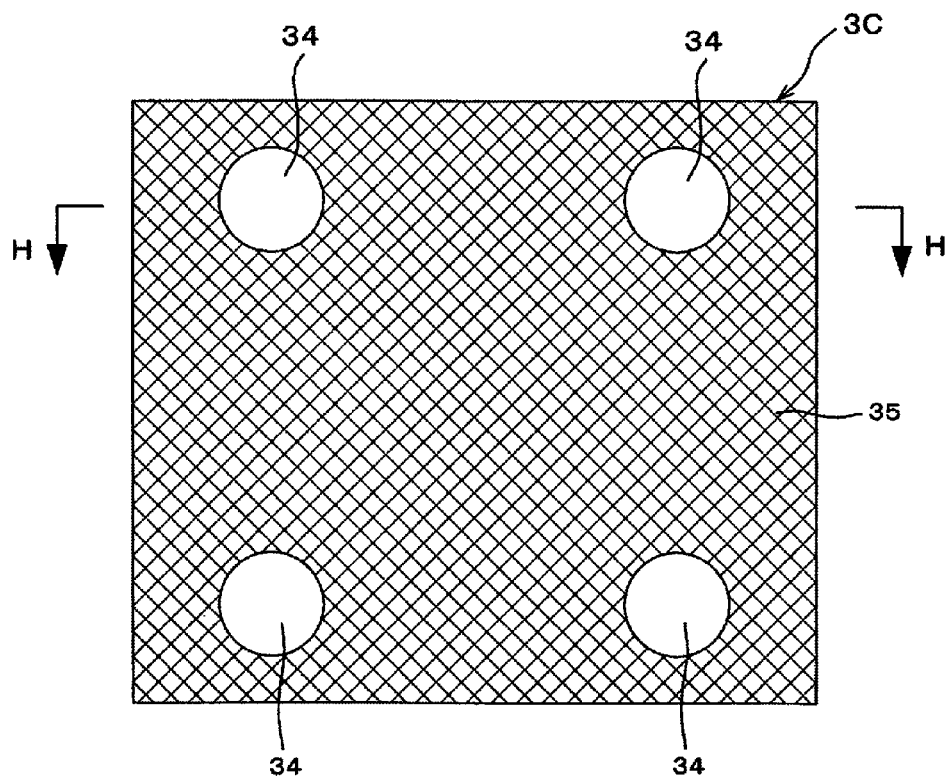
FIG. 12A is a bottom view of a movable body according to a third variation of the embodiment of FIG. 1A.
Figure 12B:
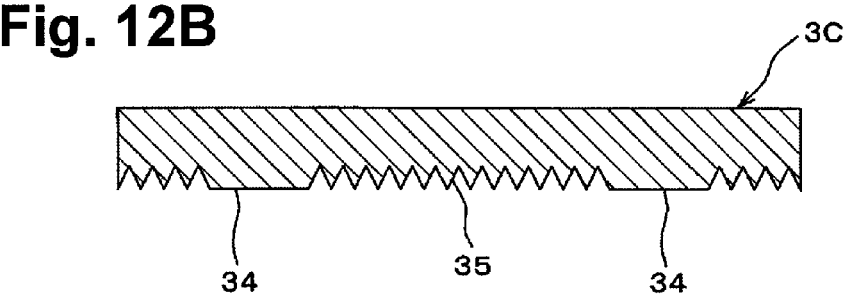
FIG. 12B is a sectional view of the movable body of FIG. 12A, taken along a line H-H of FIG. 12A.

As shown in FIGS. 12A and 12B, a movable body 3C may comprise four smoother portions 34, each having a substantially circular shape in plan view and an roughened portion 35 having surface roughness which is greater than that of smoother portion 34. Four smoother portions 34 may be disposed on the second surface of movable body 3C at respective positions near the four corners of movable body 3C. Roughened portion 35 may be disposed on the second surface of movable body 3C at an area other than that of smoother portions 34 to surround smoother portions 34 (i.e., a third variation). Roughened portion 35 may be disposed, such that a wetting angle of four liquid droplets 4 with respect to roughened portion 35 may be greater than or equal to 90 degrees. Therefore, liquid droplets 4 may not be drawn into respective roughened portions 35. Roughened portion 35 may have very great liquid repellency, such that liquid droplets 4 contact tips of projections of roughened portion 35. Therefore, the liquid repellency of smoother portions 34 is reduced relative to that of roughened portion 35, so that liquid droplets 4 adhere to respective smoother portions 34. In addition, smoother portions 34 are surrounded by roughened portion 35 having very great liquid repellency. Accordingly, the movements of liquid droplets 4 adhering to respective smoother portions 34 are controlled, such that liquid droplets 4 do not flow out of smoother portions 34. Consequently, liquid droplets 4 remain adhered to movable body 3C at smoother portions 34.

Figure 13:
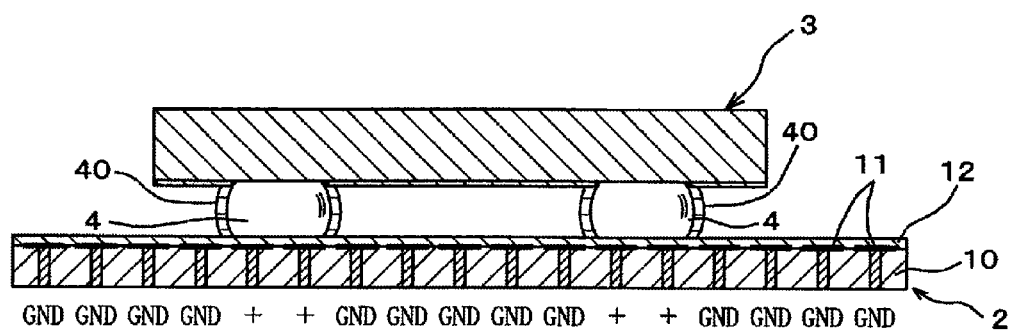
FIG. 13 is a cross-sectional view of an actuator according to a fourth variation of the embodiment of FIG. 1A.
Figure 14:
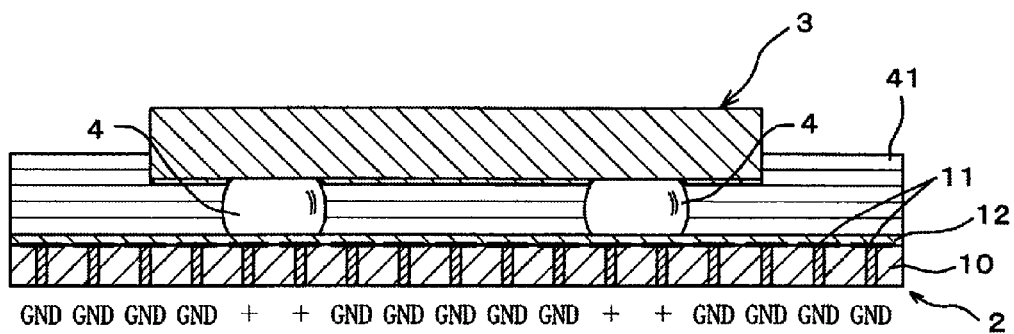
FIG. 14 is a cross-sectional view of an actuator according to a fifth variation of the embodiment of FIG. 1A.

For a liquid droplet that exerts its moving force on the movable body, a nonvolatile liquid, such as an ionic liquid (described above), which does not evaporate, may be used or a volatile liquid containing water as the main ingredient with some way to reduce or prevent the evaporation of a volatile liquid droplet may be used. For example, as shown in FIG. 13, each of volatile liquid droplets 4 may be coated with a film 40 made of a nonvolatile liquid (i.e., a fourth variation). Alternatively, as shown in FIG. 14, a clearance between fixed body 2 and movable body 3 may be filled with a nonvolatile liquid 41, and volatile liquid droplets 4 may move or may change their dimensions in nonvolatile liquid 41 (i.e., a fifth variation). With this structure, the evaporation of volatile liquid droplets 4 may be reduced or minimized. Thus, an actuator may be used for a long time.

Figure 15A:
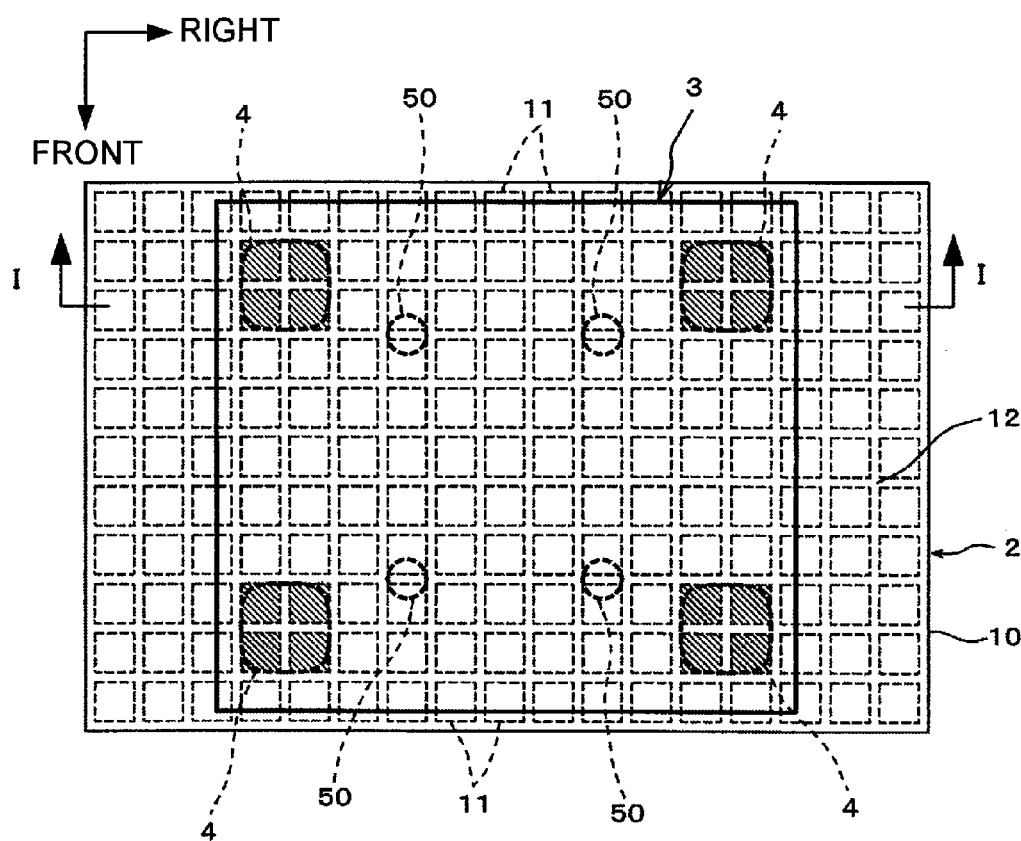
FIG. 15A is a plan view of an actuator according to a sixth variation of the embodiment of FIG. 1A.
Figure 15B:
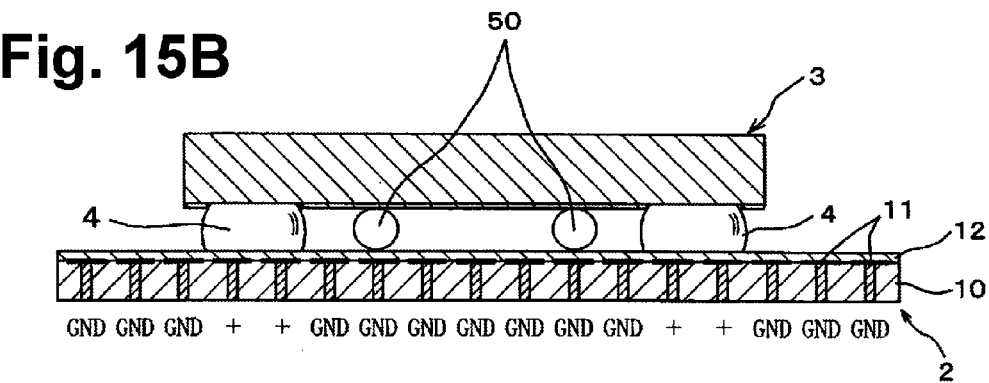
FIG. 15B is a cross-sectional view of the movable body of FIG. 15A, taken along a line I-I of FIG. 15A.

A support member may be provided between the insulating layer of the fixed body and the movable body so as to roll freely on the insulating layer while supporting the movable body (i.e., a sixth variation). For example, as shown in FIGS. 15A and 15B, four balls 50 may be disposed as the support member between insulating layer 12 and movable body 3, so as to roll freely on a surface of insulating layer 12 while being in contact with both of insulating layer 12 and movable body 3. Four balls 50 may be configured to roll on the surface of insulating layer 12 while supporting movable body 3 on fixed body 2, e.g., from below, when movable body 3 moves parallel to fixed body 2 or may rotate with respect to fixed body 2. Instead of four balls 50, a cylindrical roller that extends in one direction may be disposed therebetween as the support member.

The actuator according to the first embodiment is configured to move the movable body parallel to the surface of the insulating layer coated on the fixed body and in the desired direction(s) (e.g., four directions (front/rear, left/right) and the inclined directions). The actuator may be configured especially to move the movable body parallel to the fixed body in a predetermined direction (e.g., a seventh variation).

Figure 16A:
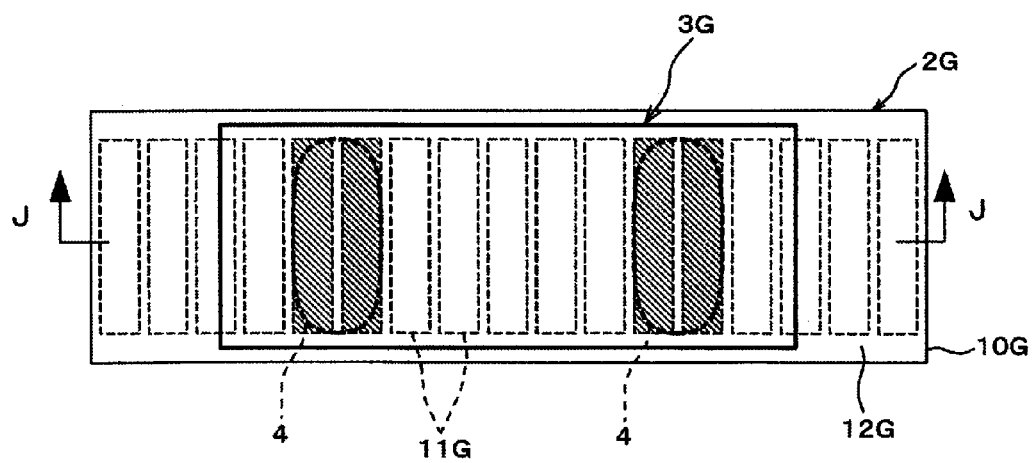
FIG. 16A is a plan view of an actuator according to a seventh variation of the embodiment of FIG. 1A.
Figure 16B:
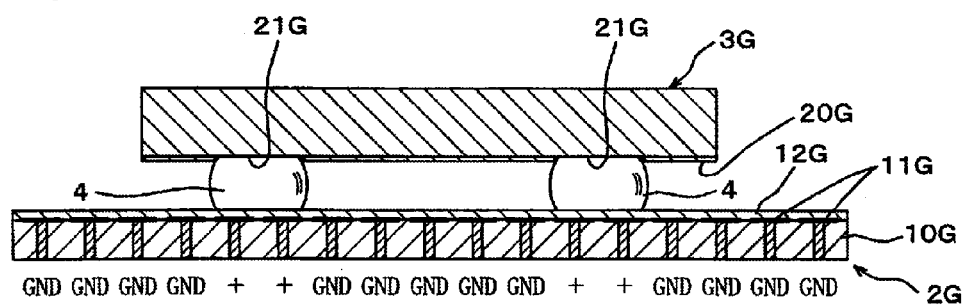
FIG. 16B is a cross-sectional view of the movable body of FIG. 16A, taken along a line J-J of FIG. 16A.

For example, as shown in FIGS. 16A and 16B, a fixed body 2G may include a substrate 10G that is a substantially rectangular plate member elongated in one direction, a plurality of drive electrodes 11G that are arranged in a line in a longitudinal direction of substrate 10G (i.e., in a right-left direction in FIG. 16A) on an first, e.g., an upper, surface of substrate 10G, and an insulating layer 12G that is disposed on the first surface of substrate 10G to cover the plurality of drive electrodes 11G.

Movable body 3G may be a plate member elongated in the longitudinal direction of substrate 10G. Movable body 3G comprises a liquid repellent layer 20G on substantially an entire second, e.g., lower, surface thereof except two areas which are disposed on either side portions thereof, in its longitudinal direction. The two areas on which liquid repellent layer 20G is not formed function as lyophilic areas 21G which have less liquid repellency than that of the areas surrounding lyophilic areas 21G.

Two liquid droplets 4 are disposed between insulating layer 12G of fixed body 2G and movable body 3G. Liquid droplets 4 adhere to lyophilic areas 21G disposed at the second surface of movable body 3G while being in contact with the surface of insulating layer 12G.

Controller 5 controls driver IC 6 to shift drive electrodes 11G to which the first potential is applied, in an direction of drive electrodes 11G to change a contact portion of each of liquid droplets 4 contacting insulating layer 12G. By this structure, two liquid droplets 4 move in the direction of drive electrodes 11G, so that movable body 3G moves parallel to fixed body 2G along the longitudinal direction of fixed body 2G.

Figure 17A:
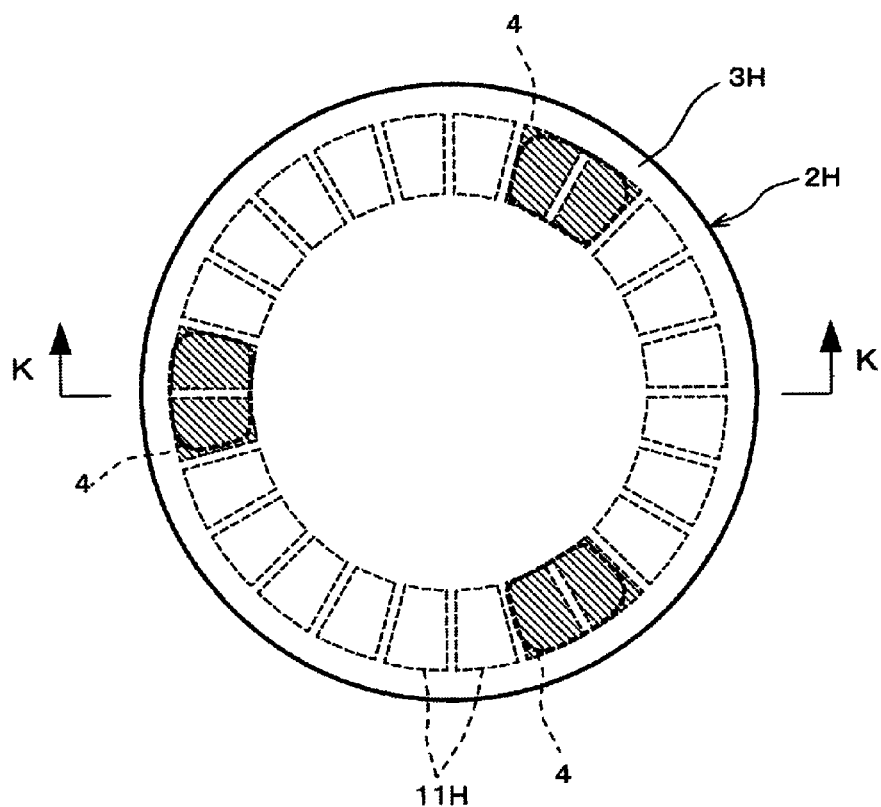
FIG. 17A is a plan view of an actuator according to an eighth variation of the embodiment of FIG. 1A.
Figure 17B:
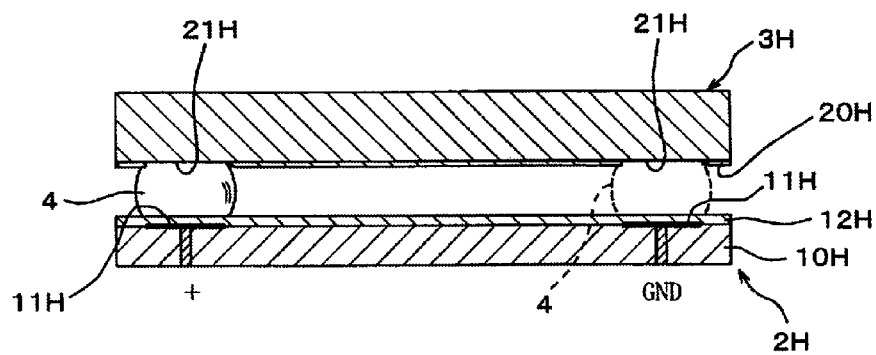
FIG. 17B is a cross-sectional view of the movable body of FIG. 17A, taken along a line K-K of FIG. 17A.

The actuator may be configured especially to rotate the movable body along a predetermined circumferential direction (i.e., an eighth variation). For example, as shown in FIGS. 17A and 17B, a fixed body 2H may comprise a substantially circular plate substrate 10H, a plurality of drive electrodes 11H having a sectorial shape, and an insulating layer 12H. The plurality of drive electrodes 11H are disposed on a first, e.g., an upper, surface of substrate 10H, annularly along a perimeter of substrate 10H to define a circle. Insulating layer 12H is disposed on the first surface of substrate 10H to cover the plurality of drive electrodes 11H.

A movable body 3H may be a substantially disc-shaped member disposed opposite to fixed body 2H to be concentric with substrate 10H of fixed body 2H. An liquid repellent layer 20H may be disposed on substantially an entire second, e.g., lower, surface of movable body 3H except three sector areas which are provided at regular intervals in a peripheral area of movable body 3H. The three sectorial areas on which liquid repellent layer 20H is not disposed function as lyophilic areas 21H which have less liquid repellency than that of the area surrounding lyophilic areas 21H.

Three liquid droplets 4 may be disposed between insulating layer 12H coated on fixed body 2H and movable body 3H. Liquid droplets 4 are adhered to respective lyophilic areas 21H disposed on the second surface of movable body 3H, which are in contact with the surface of insulating layer 12H. Liquid droplets 4 are arranged at regular intervals in a circumferential direction around the circle defined by the plurality of drive electrodes 11H annularly arranged on fixed body 2H.

Controller 5 controls driver IC 6 to shift drive electrodes 11H in the circumferential direction to change a contact portion between each of liquid droplets 4 and insulating layer 12H. By this structure, three liquid droplets 4 move in the circumferential direction while the intervals therebetween are maintained. Thus, disc-shaped movable member 3H may rotate with respect to fixed body 2H.

According to the eighth variation, liquid droplets 4 may rotate more accurately in the circumferential direction as compared with the case in which the rectangular drive electrodes 11 are arranged in matrix on fixed body 2 (see FIGS. 6A and 6B). Therefore, movable body 3H may rotate with respect to fixed body 2H without displacement of its center position. Because three liquid droplets 4 move while the intervals therebetween are maintained, movable body 3H may rotate while stably supported by liquid droplets 4.

Figure 18:
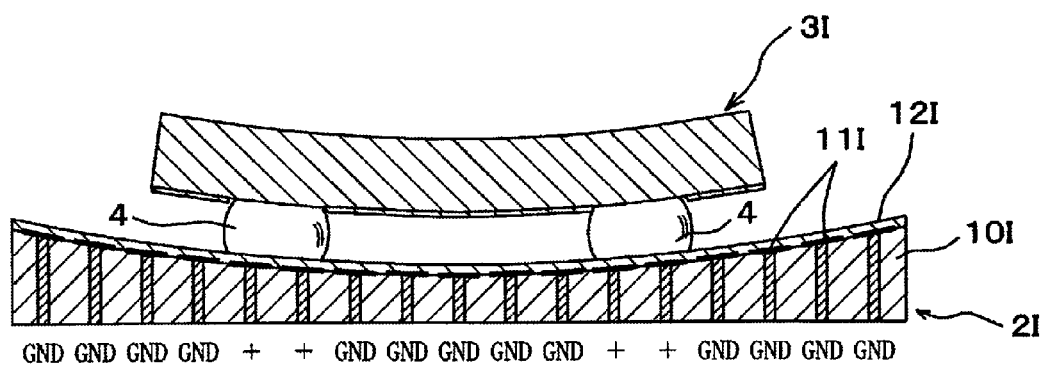
FIG. 18 is a cross-sectional view of an actuator according to a ninth variation of the embodiment of FIG. 1A.

The fixed body may not necessarily have a flat, first, e.g., upper surface. For example, as shown in FIG. 18, a substrate 10I may have a curved first surface and a plurality of drive electrodes 11I may be disposed on the curved first surface of substrate 10I (i.e., a ninth variation). In this case, a movable body 3I moves parallel to a fixed body 2I along the curved first surface of fixed body 2I in accordance with the movement of liquid droplets 4 disposed between fixed body 2I and movable body 3I. It may be preferable that a second, e.g., lower, surface of movable body 3I to which liquid droplets 4 adhere has substantially the same curvature as the first surface of fixed body 2I (i.e., the surface of an insulating layer 12I) in order to minimize unstable behavior of liquid droplets 4, such as fluctuations in the dimensions of liquid droplets 4, because of the changes of the distance between movable body 3I and fixed body 2I during the parallel translation of movable body 3I.

The fixed body may be a cylindrical member having a plurality of drive electrodes and an insulating layer at its inner surface. The movable body may be disposed inside the cylindrical fixed body. A plurality of liquid droplets may be interposed between the inner surface of the fixed body and the outer surface of the movable body.

The entire body of the movable body may not necessarily remain at a constant potential (e.g., the ground potential). The liquid droplets may remain at the constant potential if at least a portion of the movable body to which the liquid droplet adheres remains at the constant potential. Therefore, the entire body of the movable body may not necessarily be made of a conductive material, e.g., a metallic material. For example, the movable body may comprise a base portion made of an insulating material and a conductive layer formed on a second, e.g., lower, surface of the base portion. In this case, the conductive layer to which a liquid droplet adheres may remain at the constant potential.

One of the two different potentials applied to the drive electrodes by the driver IC may not necessarily be the ground potential. The driver IC may be configured to switch the potential applied between two kinds of potentials which differ from the ground potential (e.g., a first potential and a second potential) to change the liquid repellency of the surface of the insulating layer. Nevertheless, the first potential that is to be applied to the drive electrodes to decrease the liquid repellency of the surface of the insulating layer is determined, such that an absolute value of the potential difference with respect to the potential of the liquid droplets (e.g., the ground potential) is greater than the second potential that is applied to the drive electrodes to maintain the greater liquid repellency of the surface of the insulating layer.

The driver IC may be configured to selectively apply three or more different potentials to the drive electrodes. In this case, the liquid repellency of the surface of the insulating layer may be changed in more detailed levels as compared with the structure according to the first embodiment.

The plurality of liquid droplets may not necessarily be disposed between the fixed body and the movable body. The liquid member may be a single liquid droplet disposed therebetween if the single liquid droplet can support stably the movable body and have a driving force to move the movable body with respect to the fixed body.

A second embodiment of the invention is described with reference to FIGS. 19A to 22B. In the first embodiment, the four liquid droplets adhere to the second surface of the movable body (e.g., the surface of the movable body facing the insulating layer). See FIGS. 1A and 1B. In an actuator 61 according to the second embodiment, liquid droplets adhere to side surfaces of a movable body (e.g., surfaces extending perpendicular to a surface of an insulating layer). Hereinafter, the description is made according to the second embodiment, wherein like parts and components are designated by the same reference numerals as the first embodiment to avoid duplicate descriptions.

Figure 19A:
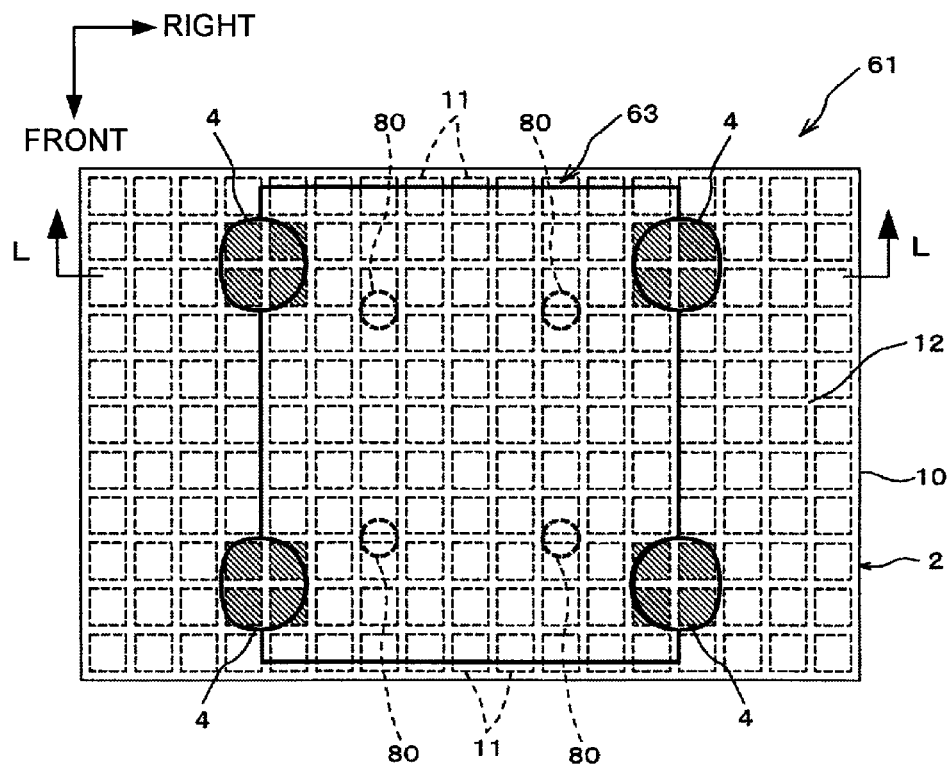
FIG. 19A is a plan view of an actuator according to another embodiment of the invention, wherein the actuator is in the reference state.
Figure 19B:
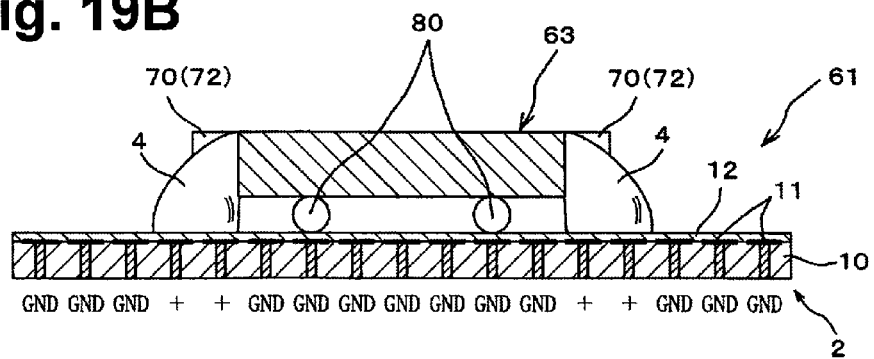
FIG. 19B is a cross-sectional view of the actuator of FIG. 19A, taken along a line L-L of FIG. 19A.

As shown in FIGS. 19A and 19B, a fixed body 2, which has substantially the same structure as that of the first embodiment, comprises a substrate 10, a plurality of drive electrodes 11, and an insulating layer 12. The plurality of drive electrodes 11 are electrically connected to a driver IC 6. The plurality of drive electrodes 11 are configured to receive one of a first potential or a second potential from driver IC 6.

A movable body 63 is a substantially rectangular plate member. As shown in FIG. 20A, movable body 63 is formed with two recessed portions 70 at each side (e.g., the left and right sides); thus, movable body 63 has a total of four recessed portions 70 formed therein. A liquid repellent layer 71 may be disposed on an entire lower surface and side surfaces of movable body 63 except recessed portions 70. Liquid repellency of an area of movable body 63 coated with liquid repellent layer 71 is greater than that of an original surface of movable body 63. Consequently, interior surfaces of recessed portions 70 function as lyophilic areas 72 in which liquid repellency is reduced with respect to the area surrounding lyophilic areas 72. Therefore, four liquid droplets 4, which are disposed on insulating layer 12 of fixed body 2, are drawn into respective recessed portions 70, so that displacement of liquid droplets 4 with respect to movable body 63 is reduced or minimized by the liquid repellent area provided around recessed portions 70, such that liquid droplets 4 do not flow out of respective recessed portions 70.

Movable body 63 may be displaced from the surface of insulating layer 12 of fixed body 2. Movable body 63 also may be supported by four supporting members, e.g., balls 80 that are disposed between insulating layer 12 and movable body 63 to roll freely while contacting insulating layer 12 and movable body 63. When movable body 63 moves with respect to fixed body 2 (e.g., the parallel translations or the rotations), four balls 80 roll on insulating layer 12 and the second surface of movable body 63. Therefore, a friction created between movable body 63 and fixed body 2 decreases, so that movable body 63 may move smoothly.

In actuator 61 according to the second embodiment, liquid droplets 4 adhere to the side surfaces of movable body 63. With this structure, when the liquid repellency of the surface of insulating layer 12 is changed to move liquid droplets 4 along the surface of insulating layer 12, the driving force of liquid droplets 4 acts directly on movable body 63. Accordingly, actuator 61 is more suitable for the parallel translations and the rotations of movable body 3 with respect to fixed body 2 as compared with actuator 1 according to the first embodiment in which liquid droplets 4 are disposed between fixed body 2 and movable body 3.

Figure 21A:
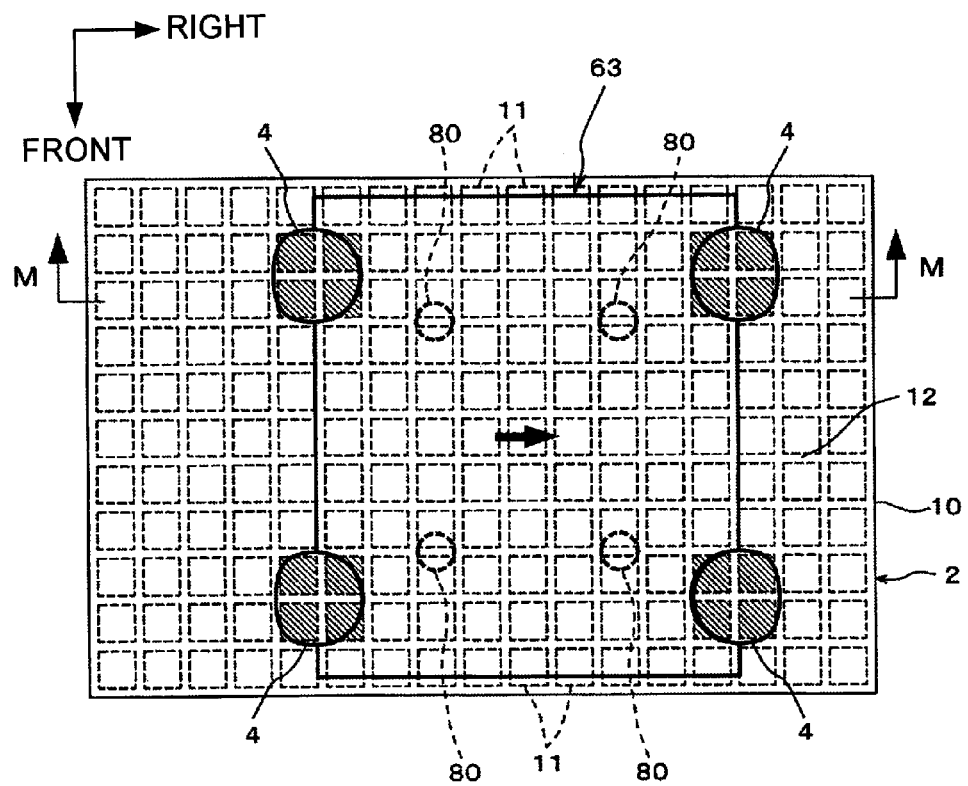
FIG. 21A is a plan view of the actuator of FIG. 20, that moves parallel to the fixed body.
Figure 21B:
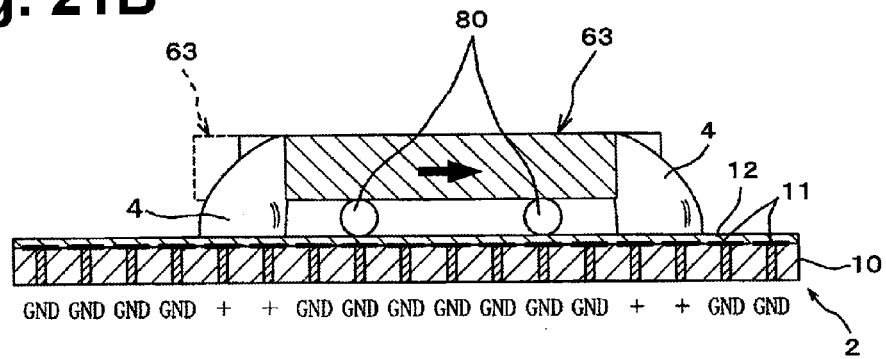
FIG. 21B is a cross-sectional view of the actuator of FIG. 21A, taken along a line M-M of FIG. 21A.

As shown in FIGS. 21A and 21B, when movable body 63 moves parallel to fixed body 2, controller 5 controls driver IC 6 to reduce simultaneously the liquid repellency of four areas on the surface of insulating layer 12. The four areas on the surface of insulating layer 12 are adjacent to the respective areas, to which four liquid droplets 4 currently contact on the surface of insulating layer 12, with respect to a predetermined direction (e.g., a rightward direction in FIG. 21A). Each of four liquid droplets 4 then may move simultaneously in the predetermined direction. At that time, the driving force of liquid droplets 4 acts directly on the side surfaces of movable body 63, so that movable body 63 moves parallel to fixed body 2 in the predetermined direction.

Figure 22A:
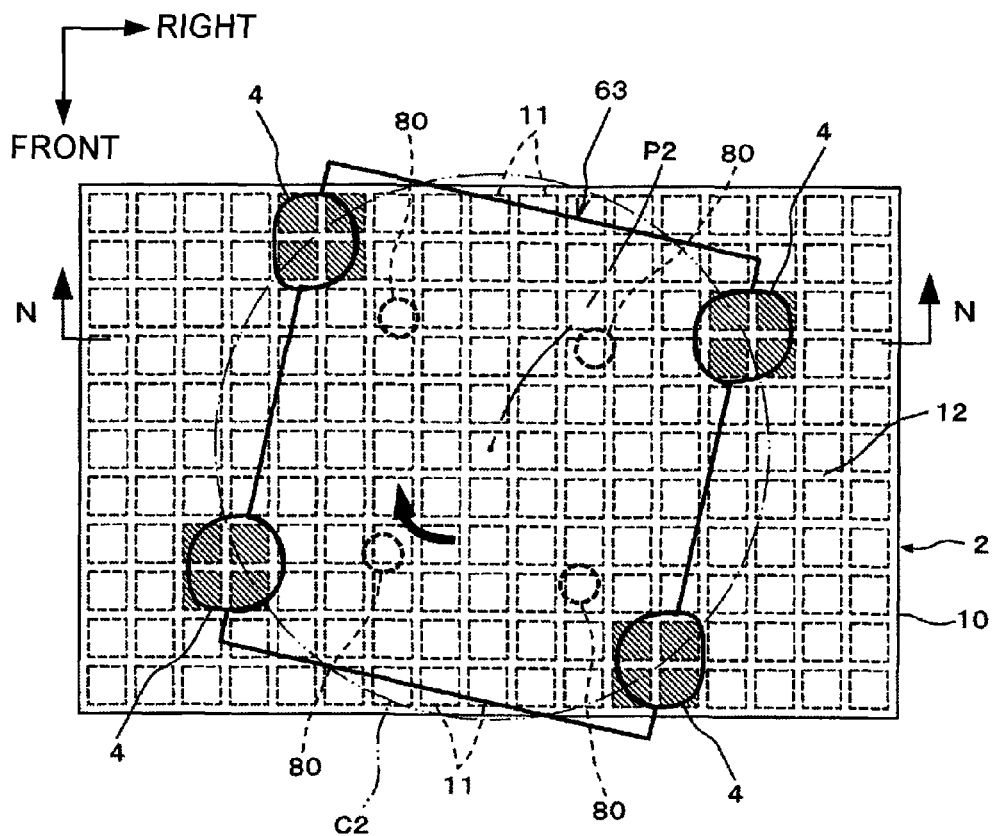
FIG. 22A is a plan view of the actuator of FIG. 20, that rotates with respect to the fixed body.
Figure 22B:
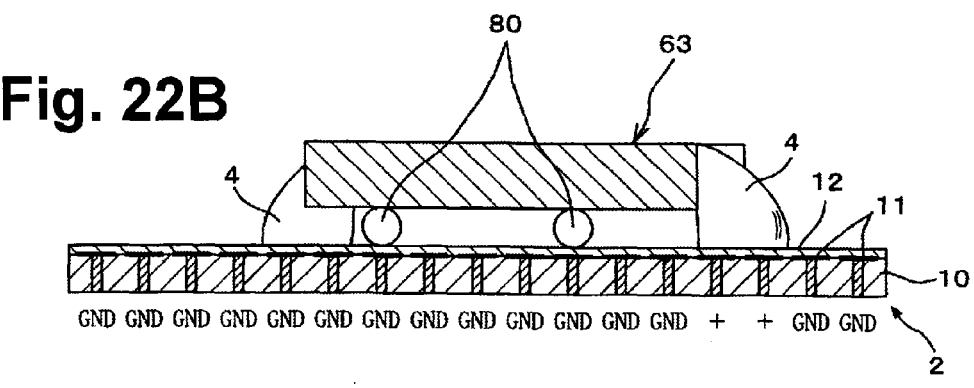
FIG. 22B is a cross-sectional view of the actuator of FIG. 22A, taken along a line N-N of FIG. 22A.

As shown in FIGS. 22A and 22B, when movable body 63 rotates with respect to fixed body 2, controller 5 controls driver IC 6 to reduce simultaneously the liquid repellency of four areas on the surface of insulating layer 12. The four areas on the surface of insulating layer 12 are adjacent to the respective areas, to which four liquid droplets 4 currently contact on the surface of insulating layer 12, with respect to a circumferential direction around a circle sharing its center with a center of gravity P2 of movable body 63 (e.g., a direction along a circle C2 sharing its center with the center of gravity P2 indicated by a double dot and dashed line in FIG. 22A). Each of four liquid droplets 4 then may move simultaneously in the circumferential direction. At that time, the driving force of liquid droplets 4 directly acts on the side surfaces of movable body 63, so that movable body 63 rotates about its center of gravity P2.

As described above, when liquid droplets 4 move on the surface of insulating layer 12, the driving force of liquid droplets 4 acts directly on the surfaces of movable body 63, so that movable body 63 moves parallel to fixed body 2 or rotates with respect to fixed body 2. Accordingly, movable body 63 may move efficiently with respect to fixed body 2. Thus, movable body 63 may move with respect to fixed body 2 even when the potential difference between the first potential and the potential of liquid droplets 4 decreases (e.g., an amount of the liquid repellency reduces on the surface of insulating layer 12). Accordingly, movable body 63 may be driven with less power consumption.

In the second embodiment, movable body 63 may be displaced from the surface of insulating layer 12, and the support member (e.g., the four balls 80) may be disposed between movable body 63 and insulating layer 12. Movable body 63 may move with respect to fixed body 62 (e.g., the parallel translations or the rotations) even when movable body 63 may contact directly to the surface of insulating layer 12 due to the omission of the support member. In this case, however, contact friction may arise between movable body 63 and insulating layer 12. Therefore, the first potential is set, such that driving force of liquid droplets 4 is greater than the frictional force by which the liquid repellency of insulating layer 12 is more greatly reduced.

The above-described various changes and modifications adopted to the first embodiment also may be adopted in the second embodiment. More specifically, for example, the changes in the retaining device for adhering the liquid droplets to the movable body (see FIGS. 9A to 12B), the addition of the means for preventing the evaporation of the liquid droplets (FIGS. 13 and 14), or the changes in the shape of the substrate or the movable body (FIGS. 16A to 18) may be adopted in the second embodiment.

While the features herein have been described in connection with various example structures and illustrative aspects, it will be understood by those skilled in the art that other variations and modifications of the structures and aspects described above may be made without departing from the scope of the invention. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. An actuator comprising:
 a fixed body, comprising:
  a substrate;
  a plurality of electrodes disposed on a surface of the substrate at regular intervals along two orthogonal directions of the surface of the substrate, each of the plurality of electrodes having a planar shape; and
  an insulating layer disposed on the surface of the substrate and covering the plurality of electrodes;
 an electrically conductive liquid member, the liquid member being disposed on a surface of the insulating layer so as to provide a contact area where the liquid member contacts the surface of the insulating layer, wherein the contact area of the liquid member covers at least two adjacent electrodes in one of the two orthogonal directions;
 a movable body in contact with the liquid member and displaced from the insulating layer in a particular direction;
 a retaining device configured to adhere the liquid member to the movable body;
 a device configured to apply a first electrical potential and a second electrical potential to each of the plurality of electrodes; and
 a controller configured to vary liquid repellency of the insulating layer by controlling the device to apply the first electrical potential to a first number of electrodes from among the plurality of electrodes and to apply the second electrical potential to a second number of electrodes from among the plurality of electrodes,
 wherein the first number of electrodes is disposed adjacent to the second number of electrodes on the surface of the substrate, and
 wherein the controller is further configured to increase the contact area of the liquid member by increasing the first number of electrodes and decreasing the second number of electrodes and to decrease the contact area of the liquid member by decreasing the first number of electrodes and increasing the second number of electrodes.

2. The actuator according to claim 1, wherein the liquid repellency of the first number of electrodes is less than that of the second number of electrodes.

3. The actuator according to claim 2, wherein the first number of electrodes includes a plurality of adjacent electrodes from among the plurality of electrodes.

4. The actuator according to claim 3, wherein the controller controls the device to continue to apply the first potential to at least one of the plurality of adjacent electrodes when increasing the first number of electrodes.

5. The actuator according to claim 1, the liquid member further comprising a plurality of liquid droplets adhering to the surface of the movable body,
 wherein the plurality of liquid droplets are disposed on the surface of the insulating layer.

6. The actuator according to claim 5, wherein the controller is further configured to control the device to reduce simultaneously liquid repellency of a plurality of first areas on the surface of the insulating layer, wherein each of the plurality of first areas is adjacent to at least one of a plurality of second areas, to which the plurality of liquid droplets contact on the surface of the insulating layer and are disposed in a substantially circumferential direction around a circle having a predetermined center, and
 the plurality of liquid droplets move along the circumferential direction in response to the reduction of the liquid repellency, so that the movable body rotates about the predetermined center.

7. The actuator according to claim 6, wherein each of the plurality of electrodes has a substantially sector shape in plan view and the plurality of electrodes are annularly disposed on the substrate to define a circle.

8. The actuator according to claim 7, wherein the plurality of liquid droplets are disposed at regular intervals in a substantially circumferential direction around the circle defined by the plurality of electrodes.

9. The actuator according to claim 5, wherein the controller is further configured to control the device to reduce simultaneously liquid repellency of a plurality of first areas on the surface of the insulating layer, wherein each of the plurality of first areas is adjacent to at least one of a plurality of second areas, to which the plurality of liquid droplets contact on the surface of the insulating layer, and are disposed in a further direction substantially parallel to the surface of the insulating layer, and
 the plurality of liquid droplets move in the further direction in response to the reduction of the liquid repellency, so that the movable body moves in the predetermined direction.

10. The actuator according to claim 5, wherein the controller is further configured to control the device to increase or decrease a size of each of the contact areas between the plurality of liquid droplets and the surface of the insulating layer to move the movable body towards to or away from the fixed body in the particular direction.

11. The actuator according to claim 5, wherein the controller is further configured to control the device to increase or decrease the contact area where at least one of the plurality of liquid droplets contacts the surface of the insulating layer to incline the movable body with respect to the fixed body.

12. The actuator according to claim 5, wherein the controller is further configured to control the device to increase the contact area where at least a first one of the plurality of liquid droplets contacts the surface of the insulating layer and to decrease the contact area where at least a second one of the plurality of liquid droplets contacts the surface of the insulating layer to incline the movable body with respect to the fixed body.

13. The actuator according to claim 5, wherein the controller is further configured to control the device to increase or decrease the contact area where at least one of the plurality of liquid droplets contacts the surface of the insulating layer to incline the movable body in the particular direction while simultaneously controlling the device to reduce liquid repellency adjacent to the contact area of each of the plurality of liquid droplets to move the movable member in a further direction, the further direction being parallel to the insulating layer.

14. The actuator according to claim 1, wherein at least a portion of the movable body contacting the liquid member has a constant potential.

15. The actuator according to claim 1, the retaining device further comprising:
   a lyophilic area disposed on the surface of the movable body; and
   a liquid repellent area disposed on the surface of the movable body and surrounds the lyophilic area, wherein the liquid repellent area has a greater liquid repellency than the lyophilic area.

16. The actuator according to claim 1, the retaining device further comprising a recessed portion formed in the surface of the movable body, and
   wherein a wetting angle of the liquid member with respect to the recessed portion is less than 90 degrees.

17. The actuator according to claim 1, wherein the substrate has a curved surface.

18. The actuator according to claim 1, further comprising a support member disposed between the insulating layer and the movable body to support the movable body.

19. The actuator according to claim 1, wherein the liquid member comprises a nonvolatile liquid.

20. The actuator according to claim 1, wherein the liquid member comprises a volatile liquid and is coated with a nonvolatile liquid.

21. An actuator comprising:
   a fixed body, comprising:
      a substrate;
      a plurality of electrodes disposed on a surface of the substrate; and
      an insulating layer disposed on the surface of the substrate and covering the plurality of electrodes;
   an electrically conductive liquid member, the liquid member being disposed on a surface of the insulating layer so as to provide a contact area where the liquid member contacts the surface of the insulating layer;
   a movable body in contact with the liquid member in a particular direction;
   a retaining device configured to adhere the liquid member to the movable body, the retaining device comprising:
      a roughened portion disposed on a surface of the movable body; and
      a smoother portion disposed on the surface of the movable body that surrounds the roughened portion and has a surface roughness less than that of the roughened portion;
   a device configured to apply a first electrical potential and a second electrical potential to each of the plurality of electrodes; and
   a controller configured to change the potential applied to each of the plurality of electrodes to vary liquid repellency of the insulating layer in response to a difference in the potential applied between each of the plurality of electrodes and the liquid member so as to change at least one of a contact portion between the liquid member and the insulating layer and a contact area of the liquid member contacting the surface of the insulating layer, such that the movable body moves relative to the fixed body,
   wherein a wetting angle of the liquid member with respect to the roughened portion is less than 90 degrees.

22. An actuator comprising:
   a fixed body, comprising:
      a substrate;
      a plurality of electrodes disposed on a surface of the substrate; and
      an insulating layer disposed on the surface of the substrate and covering the plurality of electrodes;
   an electrically conductive liquid member, the liquid member being disposed on a surface of the insulating layer so as to provide a contact area where the liquid member contacts the surface of the insulating layer;
   a movable body in contact with the liquid member in a particular direction;
   a retaining device configured to adhere the liquid member to the movable body, the retaining device comprising:
      a smoother portion disposed on a surface of the movable body; and
      a roughened portion disposed on the surface of the movable body and surrounds the smoother portion and having a surface roughness greater than that of the smoother portion;
   a device configured to apply a first electrical potential and a second electrical potential to each of the plurality of electrodes; and
   a controller configured to control the device to change the potential applied to each of the plurality of electrodes to vary liquid repellency of the insulating layer in response to a difference in the potential applied between each of the plurality of electrodes and the liquid member so as to change at least one of a contact portion between the liquid member and the insulating layer and a contact area of the liquid member contacting the surface of the insulating layer, such that the movable body moves relative to the fixed body,
   wherein a wetting angle of the liquid member with respect to the roughened portion is greater than or equal to 90 degree.

* * * * *